(12) United States Patent
Feick

(10) Patent No.: US 7,462,314 B2
(45) Date of Patent: Dec. 9, 2008

(54) MULTIPLE-MATERIAL INJECTION MOLDING

(75) Inventor: Murray Feick, Kitchener (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 415 days.

(21) Appl. No.: 11/065,136

(22) Filed: Feb. 24, 2005

(65) Prior Publication Data

US 2005/0184430 A1 Aug. 25, 2005

Related U.S. Application Data

(60) Provisional application No. 60/546,983, filed on Feb. 24, 2004, provisional application No. 60/584,126, filed on Jul. 1, 2004.

(51) Int. Cl.
B29C 45/16 (2006.01)

(52) U.S. Cl. .................. 264/255; 264/245; 264/278; 264/328.7; 264/334

(58) Field of Classification Search .................. None
See application file for complete search history.

(56) References Cited

U.S. PATENT DOCUMENTS

| | | |
|---|---|---|
| 3,435,483 A | 4/1969 | Heiner et al. |
| 3,773,450 A | 11/1973 | Svanfos |
| 3,822,107 A | 7/1974 | Wogerer |
| 3,832,110 A | 8/1974 | Hehl |
| 4,120,477 A | 10/1978 | Justamante |
| 4,243,362 A | 1/1981 | Rees et al. |
| 4,676,941 A | 6/1987 | Shiho et al. |
| 4,688,128 A | 8/1987 | Shiba et al. |
| 4,726,758 A | 2/1988 | Sekine et al. |
| 4,803,031 A | 2/1989 | Ochs et al. |
| 4,840,760 A | 6/1989 | Oishi |
| 4,935,184 A | 6/1990 | Sorensen |
| 4,945,440 A | 7/1990 | Iwahashi et al. |
| 5,045,268 A | 9/1991 | Sorensen |
| 5,084,223 A | 1/1992 | Morita et al. |
| 5,094,602 A | 3/1992 | Morita |
| 5,125,816 A | 6/1992 | Morita |
| 5,342,002 A | 8/1994 | Morita |
| 5,429,786 A * | 7/1995 | Jogan et al. ............ 264/255 |
| 5,766,654 A | 6/1998 | Groleau |
| 5,788,906 A * | 8/1998 | Morita ................. 264/245 |

(Continued)

FOREIGN PATENT DOCUMENTS

DE   36 07 410 A1   9/1987

(Continued)

OTHER PUBLICATIONS

Maniscalco, Michelle "Automotive 'Oscar' goes to two-color IP", IMM Magazine, Dec. 2004.

(Continued)

Primary Examiner—Edmund H. Lee
(74) Attorney, Agent, or Firm—Ridout & Maybee LLP

(57) ABSTRACT

A method and apparatus for creating distinct zones in a mold that can be separately filled, particularly with different materials. A molded barrier is created within the mold and the mold is configured so that the barrier separates zones in a mold cavity. Different materials may then be injected into the separate zones to create a molded article constructed of multiple materials.

14 Claims, 23 Drawing Sheets

U.S. PATENT DOCUMENTS

| | | | |
|---|---|---|---|
| 6,012,914 A | 1/2000 | Loulourgas | |
| 6,261,074 B1 | 7/2001 | Clark, Jr. | |
| 6,413,460 B1 * | 7/2002 | Wisniewski et al. | 264/254 |
| 6,500,376 B1 * | 12/2002 | Pack et al. | 264/255 |

FOREIGN PATENT DOCUMENTS

| | | |
|---|---|---|
| EP | 0 055 174 A2 | 6/1982 |
| EP | 0 055 174 A3 | 6/1982 |
| EP | 0 089 675 A1 | 9/1983 |
| EP | 0 884 155 A1 | 12/1998 |
| GB | 2 203 984 A | 11/1988 |
| JP | 58-163633 | 9/1983 |
| JP | 60-193622 | 2/1985 |
| JP | 60-90745 | 5/1985 |
| JP | 61-76333 | 4/1986 |
| JP | 61-252120 | 11/1986 |
| JP | 62-122726 | 6/1987 |
| JP | 63-295221 | 1/1988 |
| JP | 64-47523 | 2/1989 |
| JP | 1-135616 | 5/1989 |
| JP | 6-297506 | 10/1994 |
| JP | 7-334964 | 12/1995 |

OTHER PUBLICATIONS

European Search Report dated Jul. 12, 2005 EP 05 00 4062.

* cited by examiner

MULTIPLE-MATERIAL INJECTION MOLDING

CROSS-REFERENCE TO RELATED APPLICATIONS

This application claims the benefit of U.S. provisional patent application 60/546,983, filed Feb. 24, 2004, now abandoned and 60/584,126, filed Jul. 1, 2004, now abandoned which are hereby incorporated by reference in their entirety herein.

BACKGROUND OF THE INVENTION

1. Field of the Invention

The invention relates to injection molding, and particularly to a process and apparatus for molding an article constructed of multiple materials.

2. Background of the Invention

Various processes for molding articles having multiple materials have been developed. One process that is used for multiple material molding is over-molding. During an over-molding process, a first portion of the final article is molded independently and stored. The first portion is later inserted into a second mold and a second material is introduced. The second material captures and bonds to the first portion to form an article having multiple materials integrated together. The process can be repeated as required for additional materials.

Another process for molding articles constructed from multiple materials is rotational, or shuttle, molding. In a rotational molding process, a first portion of the final article is molded independently. After the first portion is molded, the mold opens and a portion of the mold, typically the core side, with the molded first portion of the article still in place is introduced into a second cavity side of the mold. A second material is then injected into the second cavity and the second material captures and bonds to the molded first portion. This process can also be repeated as required for additional materials.

Transfer molding is another technique that has been used to create molded articles having multiple materials. Similar to the processes described above, a first portion of the article is molded independently. The mold opens and the molded portion is removed from the mold and immediately placed into a second mold, or a second portion of the same mold. The mold closes and a second material is introduced into the second mold or mold portion. The second material captures and bonds to the molded first portion. Again, this process can be repeated as required for additional materials.

Additionally, shifting cavity molding has been used to create molded articles having multiple materials. During a shifting cavity molding process, a first portion of the article is molded. The mold remains closed and a portion of the mold, typically a part of the cavity side, shifts out of its original position. The shifting of the portion of the mold allows clearance for the introduction of a new cavity shape into the space the shifted portion has vacated. The molded portion of the article remains in place in the core side of the mold. A second material is introduced into the new cavity shape which captures and bonds to the first portion molded. This process can be repeated as required for additional materials.

Utilizing multiple molds or multiple cavity sides of a mold creates many disadvantages for multiple material molding. First, the mold design complexity and cost is significantly increased which adds to the total cost of making the articles. Second, the labor required to manufacture the final articles is significantly increased. Additionally, the cost and complexity of the injection molding machines used to perform the processes are increased. Finally, such a process adds to the amount of maintenance required to continually produce acceptable molded articles.

It is, therefore, desirable to provide a simplified and less expensive method and apparatus for multiple material injection molding.

SUMMARY OF THE INVENTION

The invention allows the molding of multiple material articles without the use of multiple cavity sides of the mold or multiple molds.

The invention includes a method and apparatus for creating distinct zones in a mold cavity that can be filled with different materials by creating a molded barrier that is stationary. The method includes the steps of configuring the mold to create an enclosed barrier molding portion within the mold cavity, injecting a barrier material into the barrier molding portion to form a molded barrier, re-configuring the mold so that the barrier separates a plurality of empty zones in the mold cavity, injecting a first material into at least one empty zone and injecting a second material into another empty zone of the mold cavity.

Another aspect of the present invention includes a method of creating distinct zones within a mold cavity by creating a movable molded barrier. This is accomplished by first configuring the mold to create an enclosed barrier molding portion and molding a barrier. The mold is then re-configured and the barrier is positioned in a barrier receiving portion to create separation between a plurality of empty zones in the mold cavity. The separated zones are then filled to create the molded article. The mold is then opened and the article is ejected from the mold. In some circumstances the barrier may be large enough to become one of the zones within the mold or one of the separated zones may be filled with the barrier material.

The disclosed processes provide various advantages over processes previously used for multiple material molding. First, the mold design is less complex and less costly. Next, the total cost of making the articles is reduced. Additionally, the amount of labor required to make the articles is reduced. The injection molding machines required to perform the processes are also less costly and less complex since in some cases there would be less steel moving and fewer movable parts. Finally, the required maintenance of the mold is reduced.

Other aspects and features of the present invention will become apparent to those ordinarily skilled in the art upon review of the following figures and detailed description.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE DRAWINGS

Specific embodiments of the present invention are now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

Figure 1:
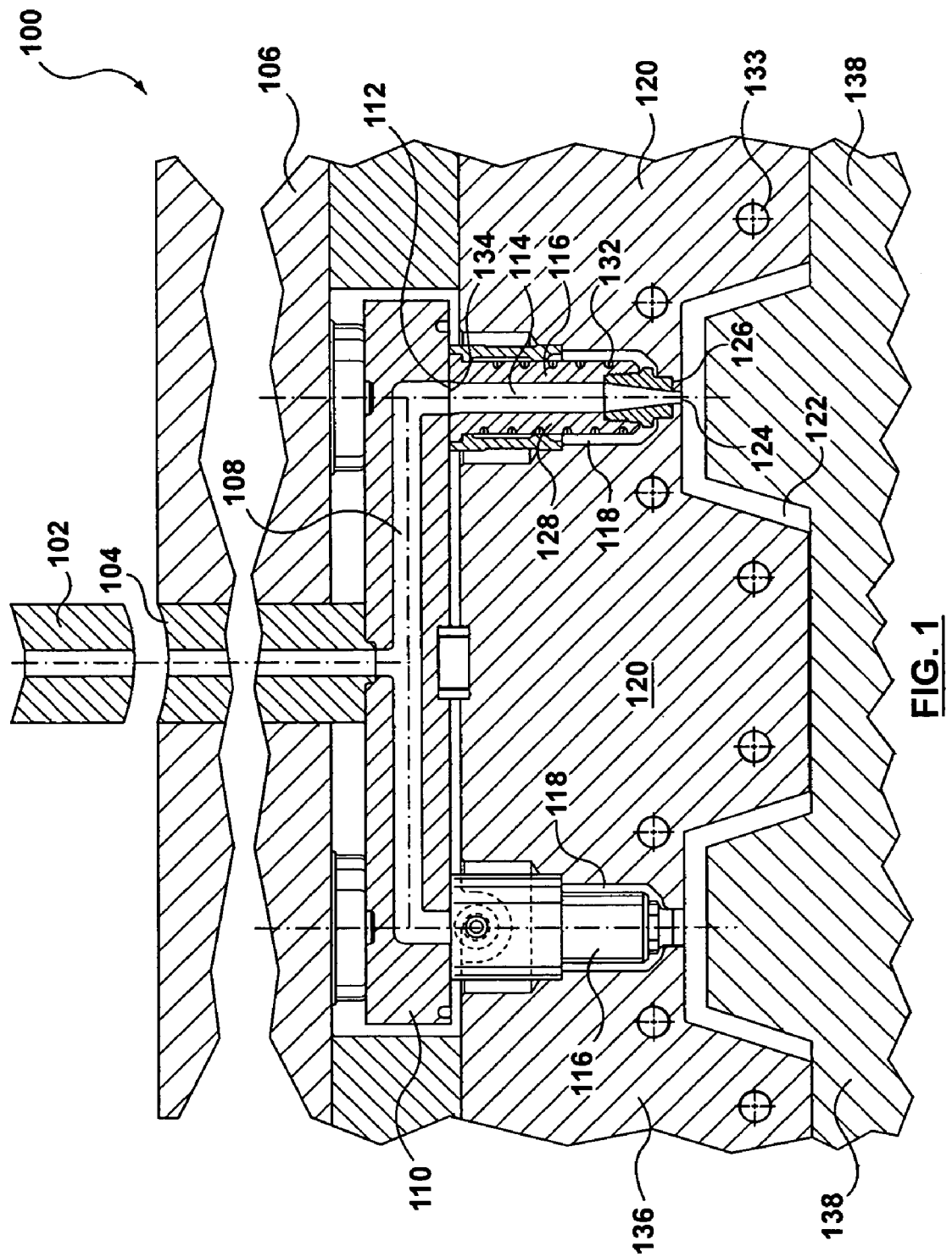
FIG. 1 is a cross-sectional view of an injection molding apparatus.

Referring first to FIG. 1, one example of an injection molding apparatus 100 with which the present invention may be utilized is shown. The injection molding apparatus includes a machine nozzle 102, which introduces a melt stream under pressure into the injection molding system via a sprue bushing 104 that is positioned within a machine platen 106. From sprue bushing 104, melt flows into a manifold melt channel 108 provided in a hot runner manifold 110. In injection molding apparatus 100, manifold 110 allows the melt stream to be distributed through manifold melt channel outlets 134 and into nozzle melt channels 114 provided in respective nozzles 116. Nozzles 116 are positioned within nozzle bores, or cavities, 118 of a mold 120. As would be apparent to one of ordinary skill in the art, mold 120 may include one or more mold plates, a mold cavity plate 136 and a mold core plate 138. Each nozzle 116 is in fluid communication with a mold cavity 122 via a mold gate 124 so that the melt stream may be injected through nozzle melt channel 114 and a nozzle tip 126 and into mold cavities 122.

A cross-sectional view of one of nozzles 116, provided in injection molding apparatus 100, is shown. Nozzle 116 has a nozzle melt channel inlet 112, at an upper end of nozzle melt channel 114, aligned with outlet 134 of manifold melt channel 108 to receive the melt stream and to deliver the melt through mold gate 124 to mold cavity 122. Nozzle 116 includes a nozzle body 128, and nozzle tip 126. Injection molding apparatus 100 may include any number of such nozzles 116 located in respective nozzle bores 118 for transmitting melt from respective nozzle melt channel inlets 112 to respective mold gates 124. Injection molding apparatus 100 utilizes a nozzle heater 132 and cooling channels 133 to moderate the temperature of the melt. As shown, nozzle 116 is thermal-gated, however it should be understood that nozzle 116 may alternatively be valve-gated.

Figure 2:
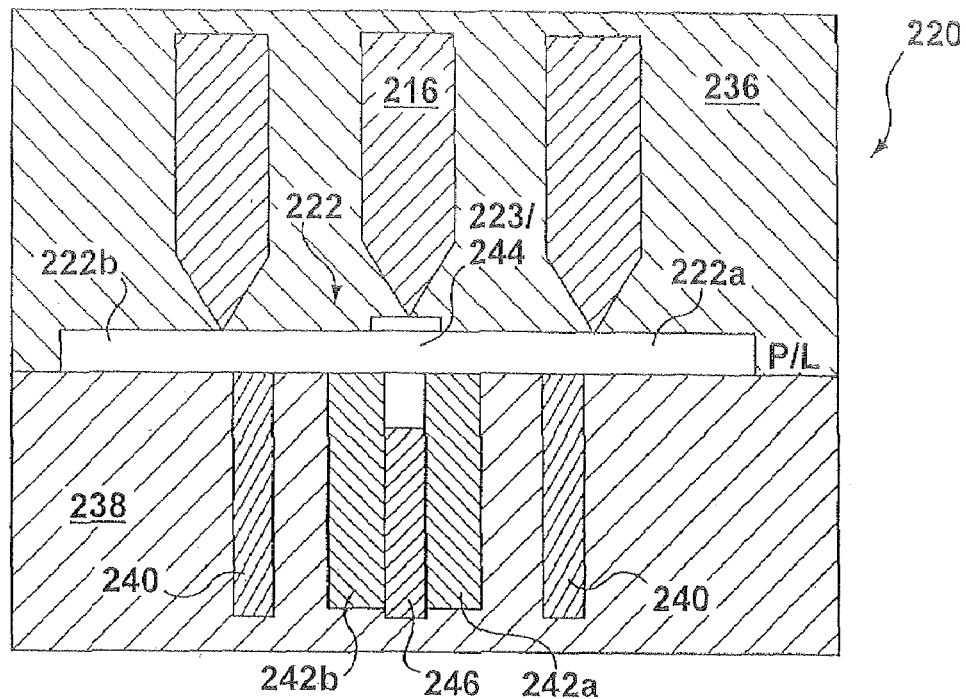
FIG. 2 is a cross-sectional view of a mold according to one embodiment of the invention.

A mold 220 in an injection molding apparatus such as injection molding apparatus 100 described above may include several components, as shown in FIG. 2. Mold 220 is in a "mold closed" position. Mold 220 includes a mold cavity 222, that is formed from a plurality of cavity zones 222a and 222b, a barrier molding portion 244 and a barrier receiving portion 223, as described further below. Mold cavity 222 is generally defined by a space created between a mold cavity plate 236 of mold 220, also known as a stationary plate or "A-side" of the mold; and a mold core plate 238 of mold 220, also known as a moving or "B-side" of the mold. Mold cavity plate 236 and mold core plate 238 of mold 220 are separable along a parting line, P/L. Mold 220 also includes retractable ejector pins 240 which are used to remove a molded article from mold cavity 222.

Figure 3:
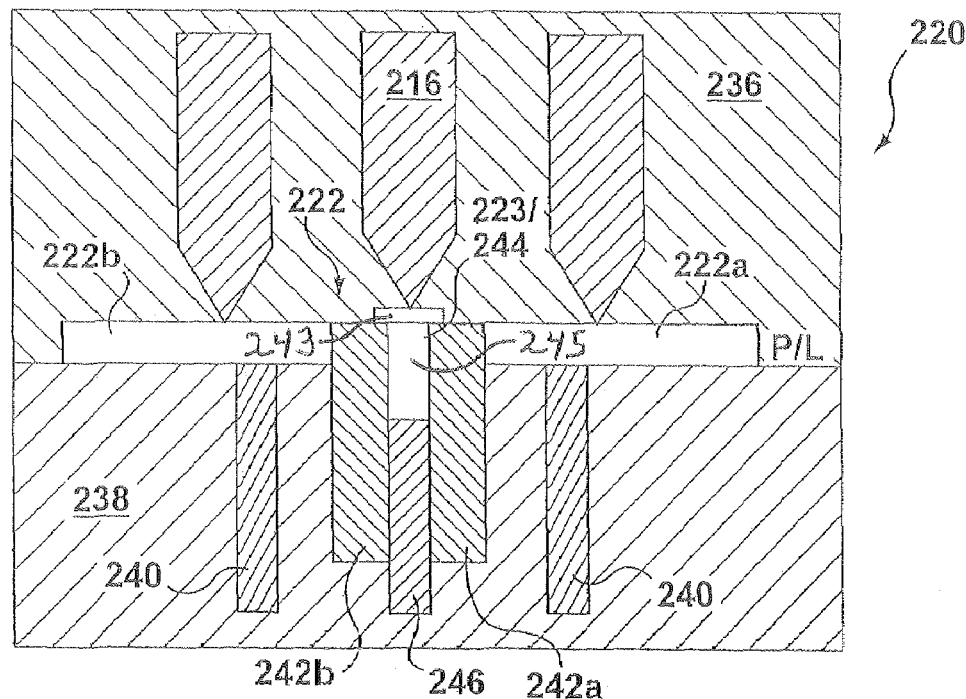
FIGS. 3 to 11 illustrate steps of a process for molding an article using the mold of FIG. 1.

Barrier molding portion side walls 242a and 242b are provided in mold 220. Although side walls 242a and 242b are illustrated as separate parts, it should be understood that they may be constructed from one piece. Side walls 242a and 242b are retractable so that, along with a barrier core wall 246 and mold cavity plate 236 of mold 220, they may selectively enclose barrier molding portion 244. In other words, side walls 242a and 242b may be extended so that they form sides of barrier molding portion 244 as shown in FIG. 3. Barrier core wall 246 may also be retractable so that it may act as an ejector pin.

The steps of a process for molding multiple material articles with the apparatus of FIG. 2 are illustrated in FIGS. 2-11. The first step of the process is to configure the mold in the "mold closed" position, as shown in FIG. 2. When the mold is in the closed position, ejector pins 240, side walls 242a and 242b and barrier core wall 246 are retracted and mold cavity 222 is vacant.

FIG. 3 shows the second step in a multiple material molding process using the apparatus of FIG. 2. In the second step, barrier molding portion side walls 242a and 242b move forward and seal against mold cavity plate 236 of mold 220. Barrier core wall 246 remains retracted so that barrier molding portion 244 is enclosed.

Figure 4:
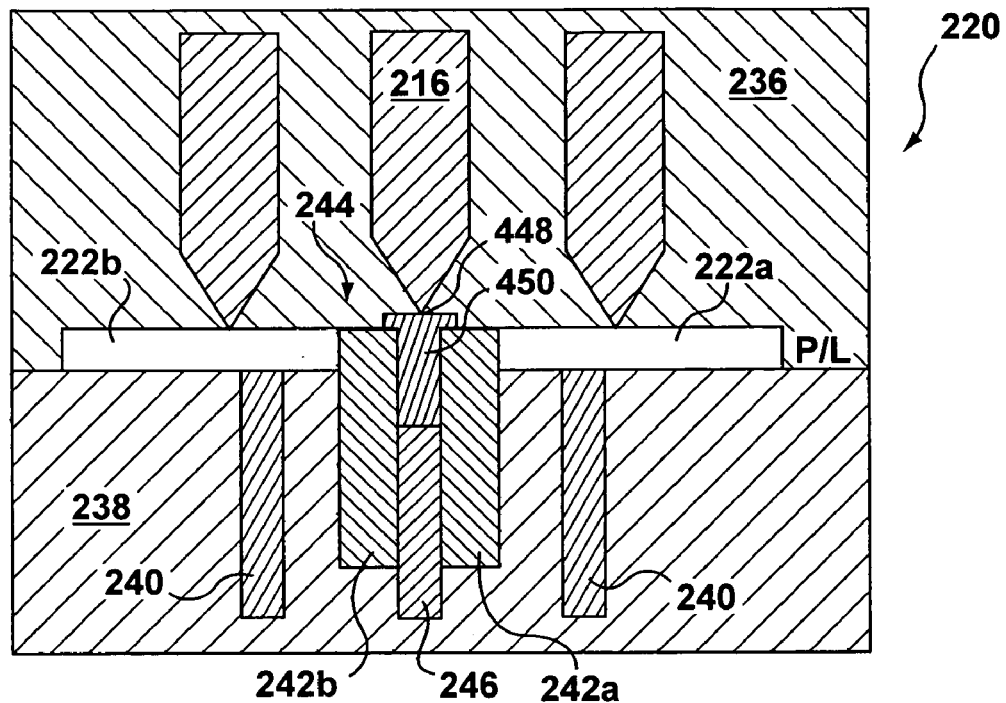

In the next step, a barrier valve gate 448 is opened and a barrier material is injected into barrier molding portion 244 via barrier nozzle 216, as shown in FIG. 4. The material in barrier molding portion 244 may be packed and cooled to form a barrier 450.

Figure 5:
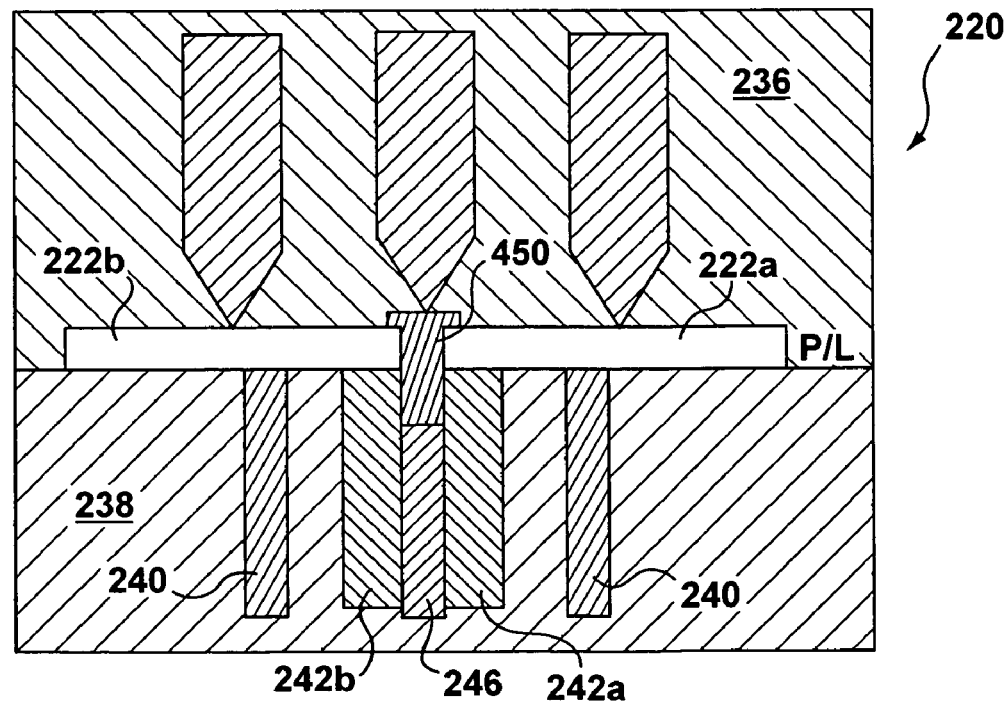

After barrier 450 is formed, barrier valve gate 448 is closed and barrier side walls 242a and 242b are retracted into the position shown in FIG. 5. After side walls 242a and 242b are retracted, the sides of barrier 450 are exposed to cavity zones 222a and 222b and barrier 450 separates cavity zone 222a from 222b. In the present embodiment, barrier molding portion 244 and barrier receiving portion 223 are the same and barrier 450 remains stationary until it is ejected as part of a molded article 960.

Figure 6:
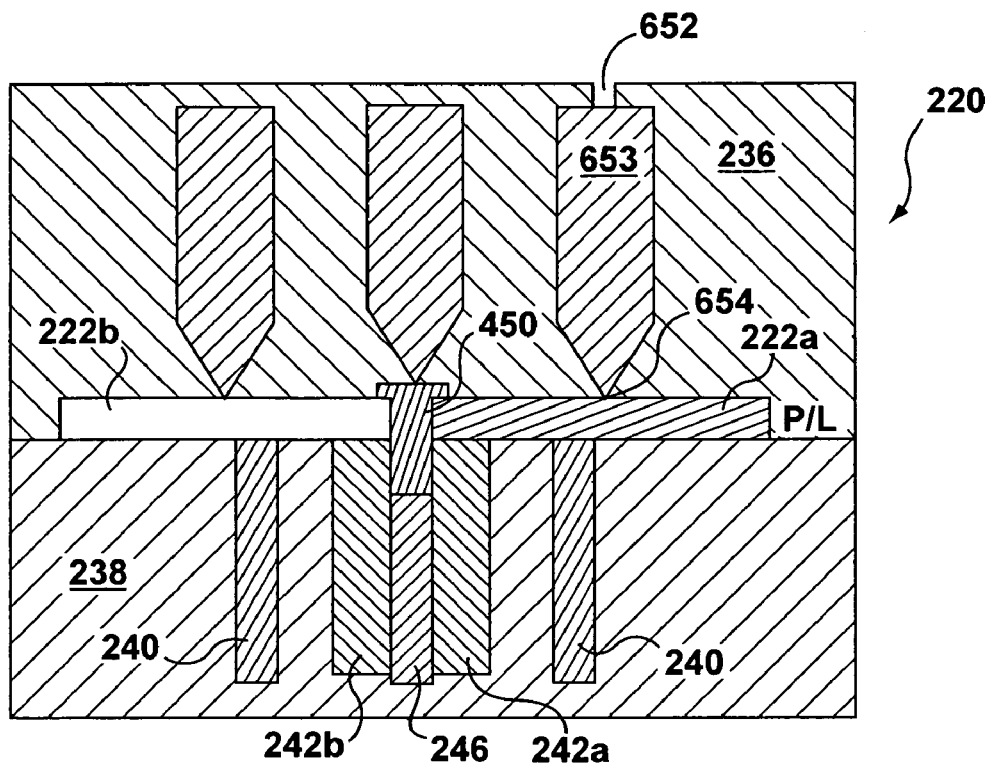
Figure 7:
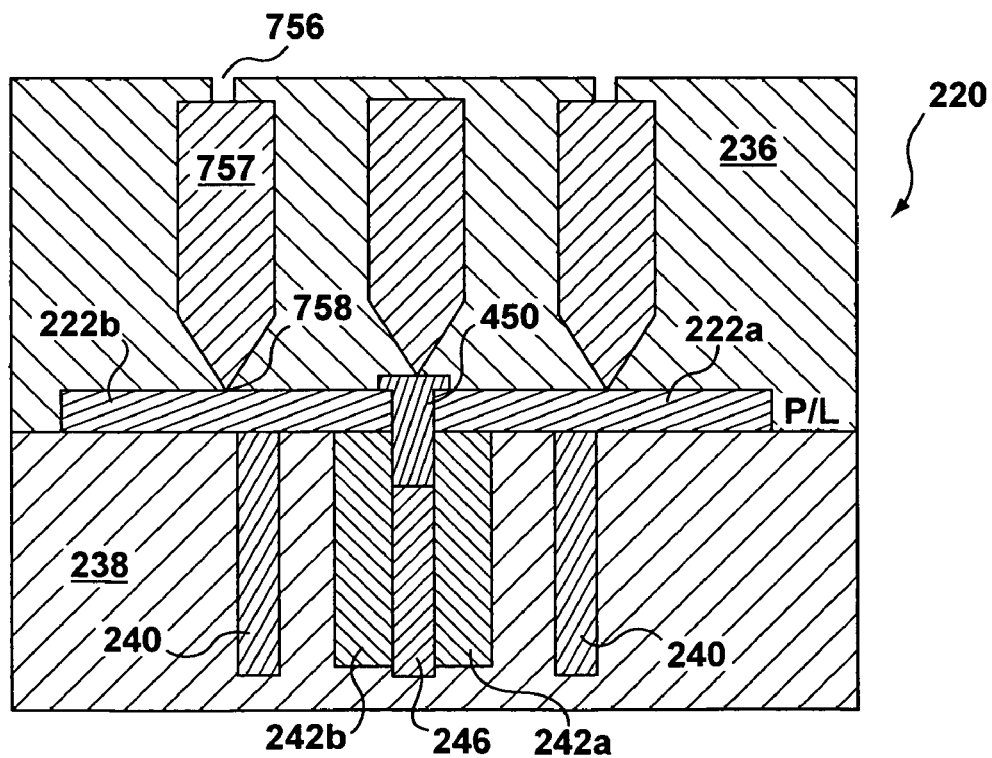

FIGS. 6 and 7 show the injection of first and second materials into cavity zones 222a and 222b via nozzles 653, 757. Following the retraction of side walls 242a and 242b, the first material is injected along a runner system 652, through nozzle 653 and a gate 654 and into cavity zone 222a. The molten first material fills cavity zone 222a and contacts barrier 450. The contact between the molten first material and barrier 450 results in a bond forming between the two.

Next, the second material is injected along a runner system 756, through nozzle 757 and a gate 758 and into cavity zone 222b. The second material may be injected at the same time as the first material, after the first material or after the first material has been partially injected into cavity zone 222a. The molten second material also contact barrier 450 and forms a bond. It shall be understood that the first and second material may be the same material, and they may be the same material as the barrier material. In addition, it should be understood that each of nozzles 653 and 757 may be valve-gated or thermal-gated and it should be further understood that nozzles 653 and 757 can be edge-gated.

Figure 8:
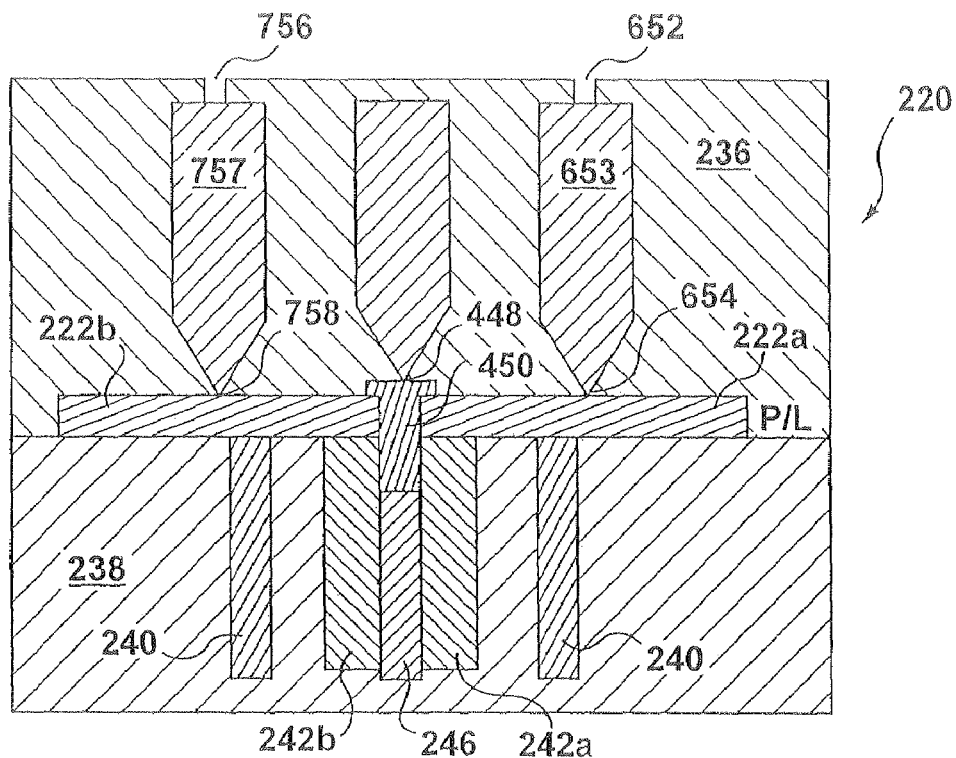

FIG. 8 shows an optional next step of the multiple material molding process. In the optional step, an opening into barrier molding portion 244 is created, such as by opening barrier valve gate 448, and barrier molding portion 244 is placed under pressure. The pressurization of barrier molding portion 244 improves the bond between barrier 450 and the first and second materials used to fill cavity zones 222a and 222b.

Figure 9:
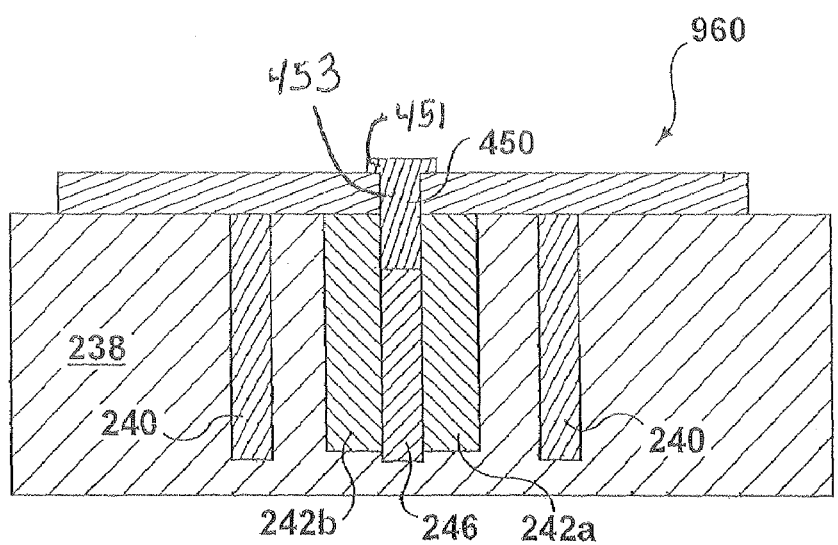
Figure 10:
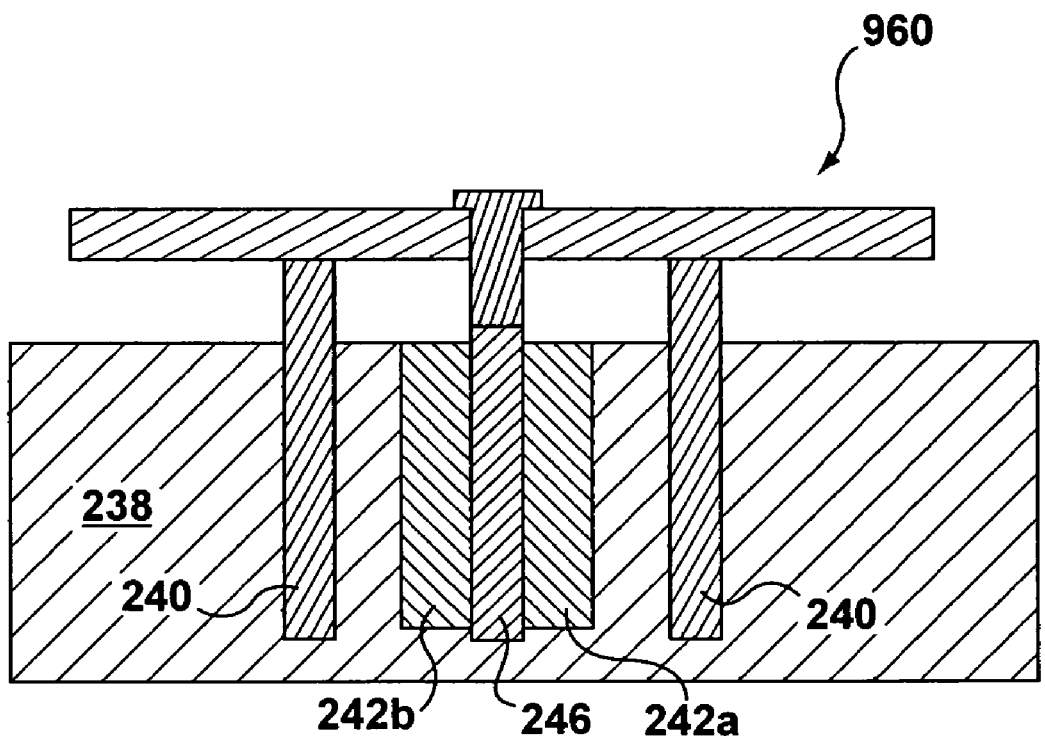
Figure 11:
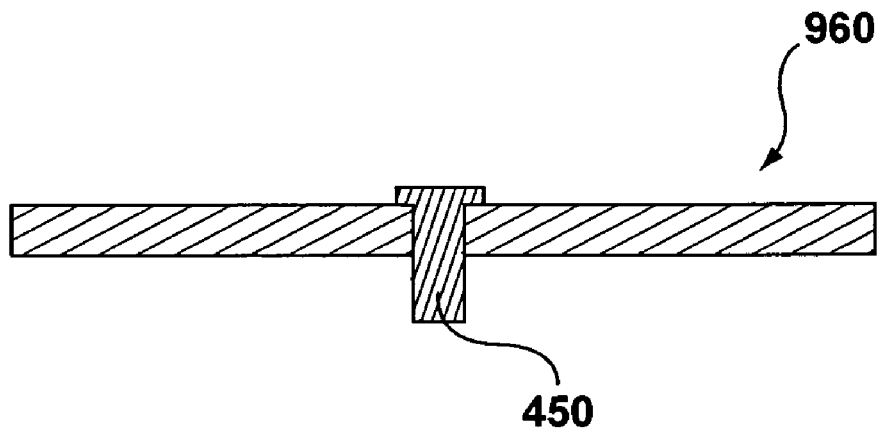

After the barrier, first and second materials are injected and barrier molding portion 244 is optionally pressurized, the materials are allowed to cool to form molded article 960 that is constructed with multiple materials. After cooling, mold core plate 238 of mold 220 is removed as shown in FIG. 9 so that molded article 960 may be removed from mold cavity 222. Ejector pins 240 and barrier core wall 246 may then be extended, as shown in FIG. 10, to push molded article 960 from mold core plate 238 of mold 220. FIG. 11 shows molded article 960 free from injection mold 220.

After molded article 960 is completely removed from mold 220, ejector pins 240 and barrier core wall 246 are retracted. Following the retraction of ejector pins 240 and barrier core wall 246, mold core plate 238 is repositioned against mold cavity plate 236 of mold 220. The repositioning of mold core plate 238 of mold 220 completes the reconfiguration of mold 220 into the closed position shown in FIG. 2. The process may then be repeated to produce additional molded articles 960. As seen in FIG. 3, in the illustrated embodiment the barrier molding portion 244 is configured by barrier molding portion side walls 242a and 242b to include a first portion 245 that is located between the cavity zones 222a, 222b, and a second portion 243 that is raised above and partially overlaps each of the cavity zones 222a, 222b. As shown in FIG. 9, this configuration results in barrier 450 having a first portion 453 that is located between and isolates cavity zones 22a and 222b, and a second portion 451 that is raised above and partially overlaps the cavity zones 222a and 222b.

In the embodiment described above, barrier molding portion 244 and barrier receiving portion 223 coincide so barrier 450 is molded in a location within mold 220 that does not require it to be relocated prior to the injection of material into cavity zones 222a and 222b. In other embodiments, the barrier may be molded in a location different from the final barrier position, but within a common cavity, and subsequently moved into position prior to the injection of subsequent materials, as described below.

Figure 12:
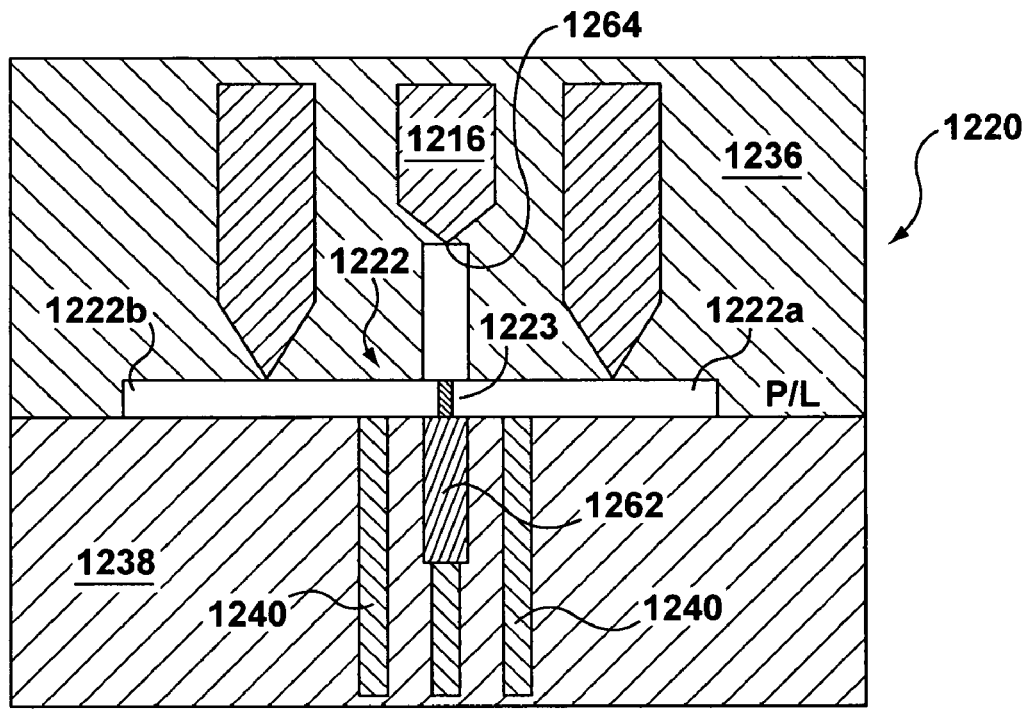
FIG. 12 is a cross-sectional view of a mold according to another embodiment of the invention.

For example, FIG. 12 illustrates an embodiment where a mold 1220 is in a configuration corresponding to a first step in a process for molding a multiple material article. Mold 1220 is in a "mold closed" position and includes a mold cavity 1222, that includes cavity zones 1222a and 1222b, a barrier receiving portion 1223 and a barrier pocket 1264 which includes a barrier molding portion 1244. Mold cavity 1222 is generally defined by a space created between a mold cavity plate 1236 of mold 1220, also known as the stationary plate or "A-side" of the mold; and a mold core plate 1238 of mold 1220, also known as the moving plate or "B-side" of the mold. Mold cavity plate 1236 and mold core plate 1238 of mold 1220 are separable along a parting line, P/L. Mold 1220 also includes retractable ejector pins 1240 which are used to remove a molded article 2060 from mold 1220 and a retractable barrier core 1262.

Figure 13:
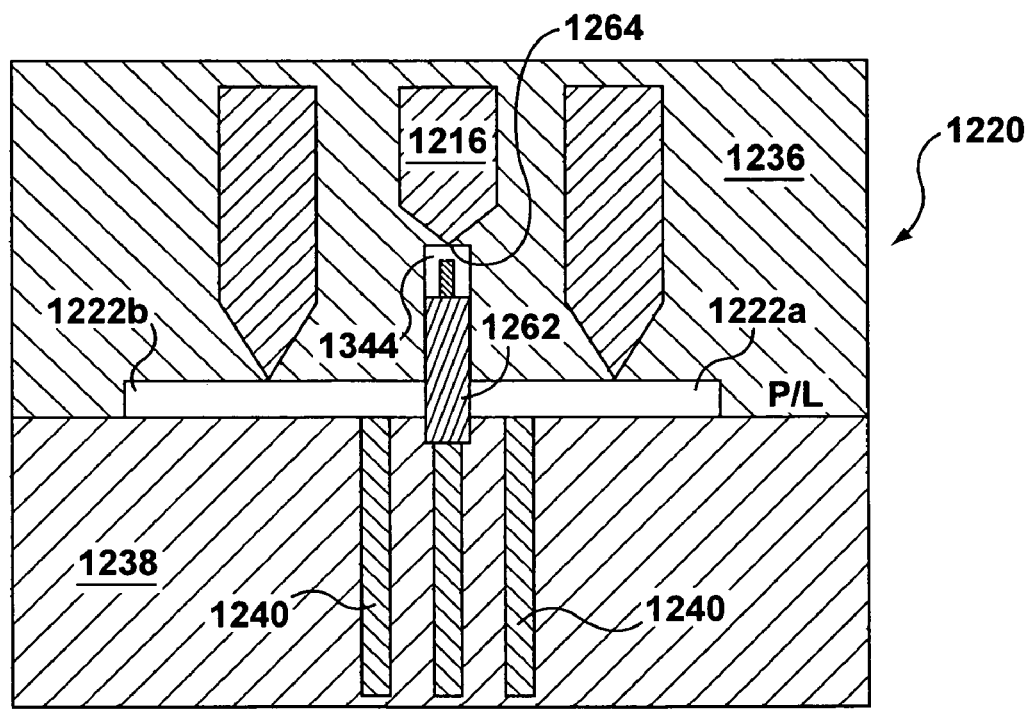
FIGS. 13 to 22 illustrate steps of a process for molding an article using the mold of FIG. 12.

A second step of the process is shown in FIG. 13. During the second step, barrier core 1262 is extended into pocket 1264. The extended barrier core 1262 in combination with pocket 1264 enclose barrier molding portion 1344.

Figure 14:
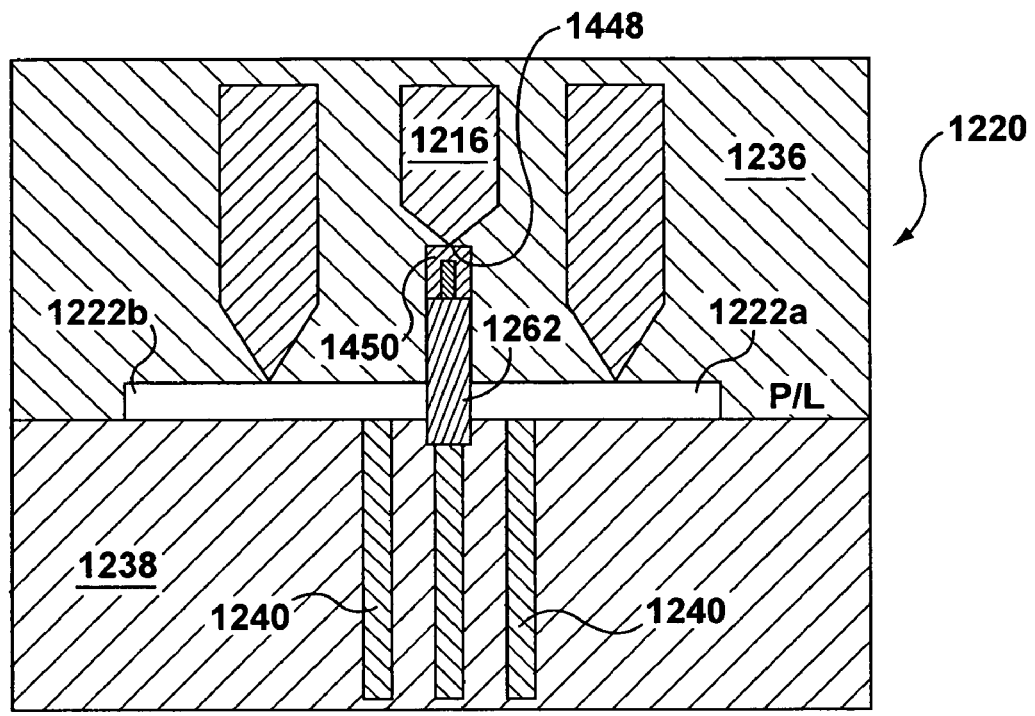

Following the extension of barrier core 1262, a barrier valve gate 1448 is opened and a barrier material is injected into barrier molding portion 1344 via a barrier nozzle 1216, as shown in FIG. 14. The material that is injected into barrier molding portion 1344 may then be packed and cooled to form a barrier 1450.

Figure 15:
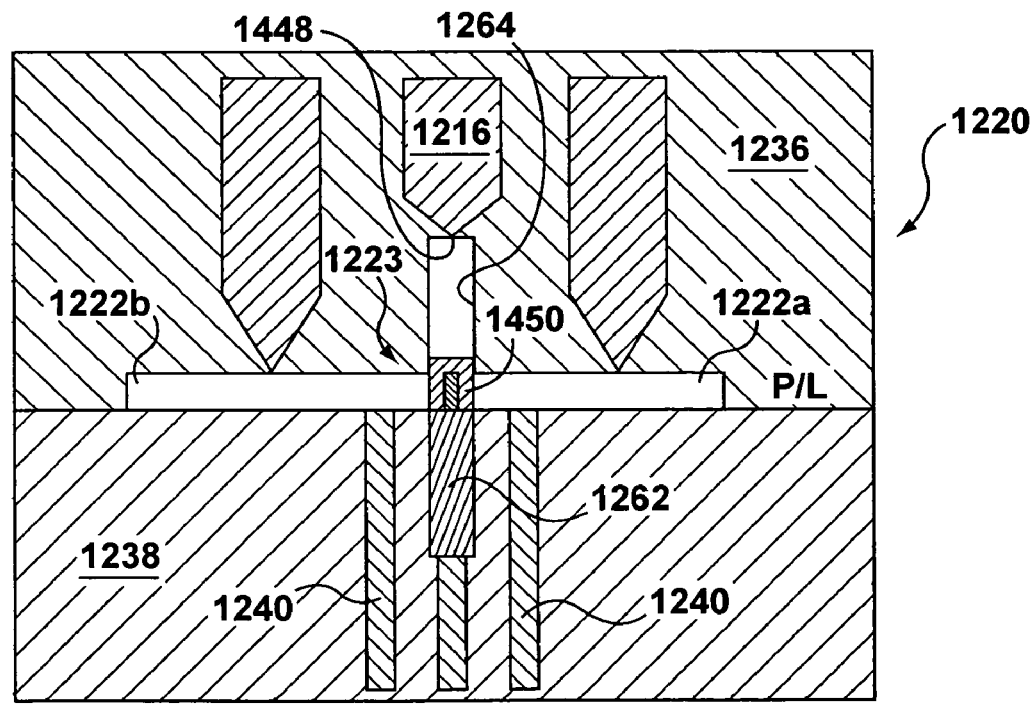

After barrier 1450 is formed, barrier valve gate 1448 is closed and barrier core 1262 is retracted into the position shown in FIG. 15. When barrier core 1262 is retracted, barrier 1450 travels with barrier core 1262 so that barrier 1450 is placed into barrier receiving portion 1223 which is located between and separates cavity zones 1222a and 1222b.

Figure 16:
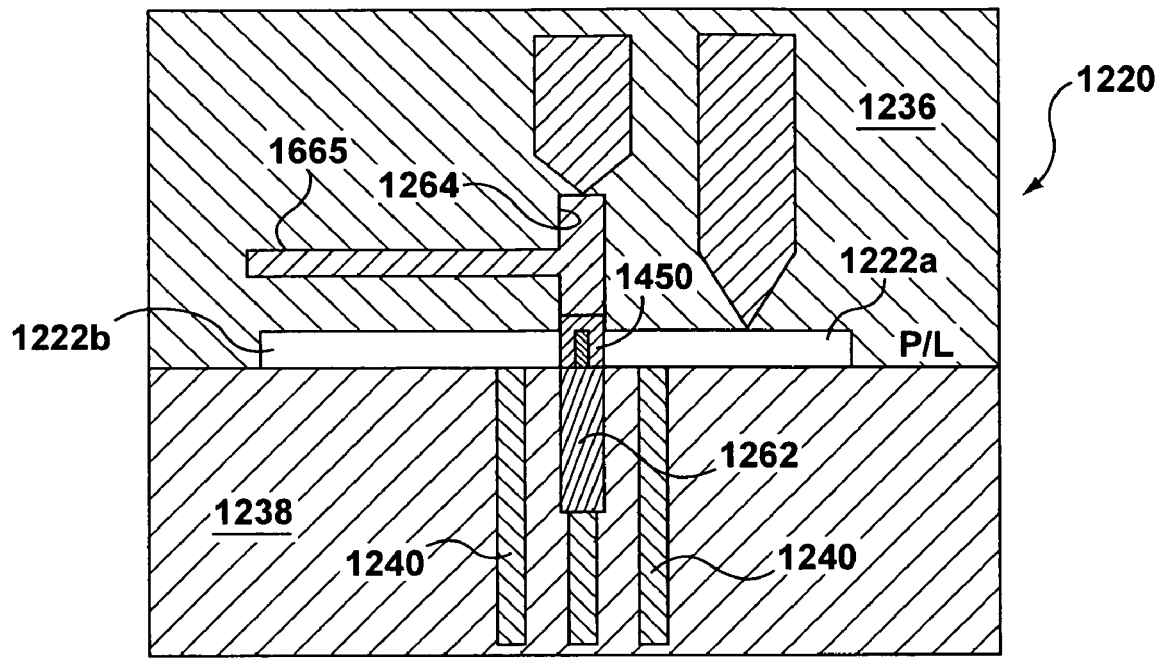

Pressurized gas may be injected through a pressurized gas line 1665 and into pocket 1264 to assure that barrier 1450 is seated on barrier core 1262, and in barrier receiving portion 1223, and forms a seal with the walls of pocket 1264, as shown in FIG. 16.

Figure 17:
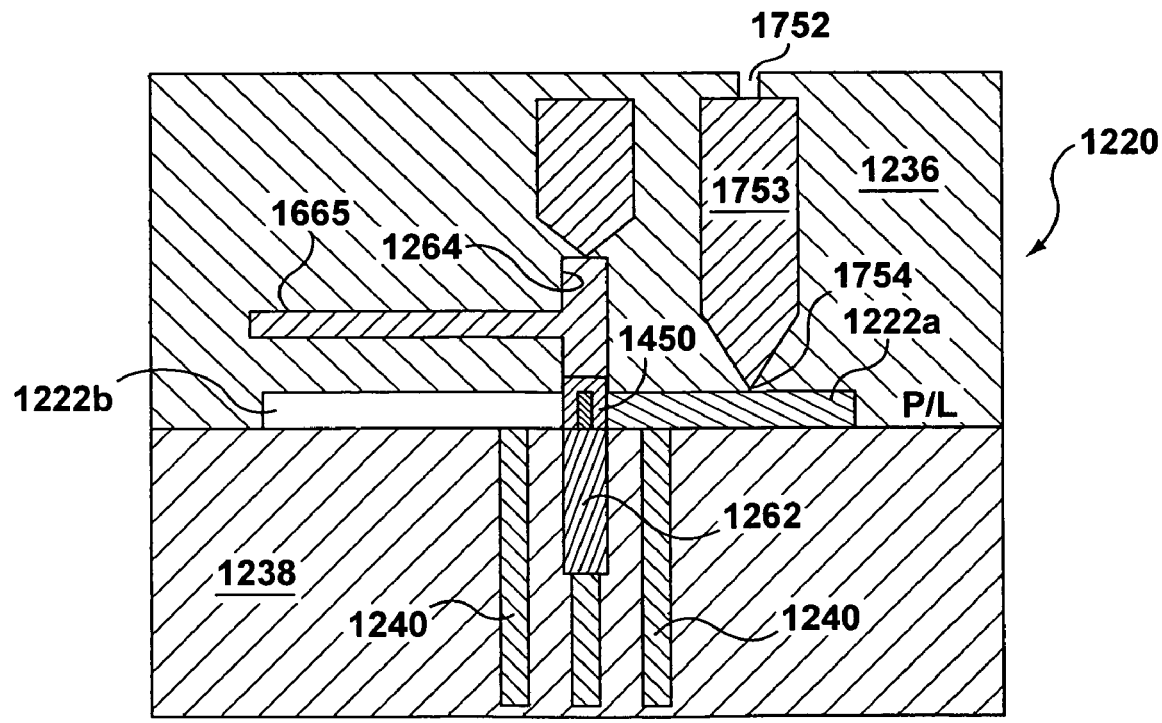

After the seal is formed, first and second materials are injected into zones 1222a and 1222b of mold cavity 1222. The first material is injected along a runner system 1752, through a nozzle 1753 and a gate 1754 and into cavity zone 1222a, as shown in FIG. 17. The molten first material fills cavity zone 1222a and contacts barrier 1450. The contact between the molten first material and barrier 1450 results in a bond forming between the two.

Figure 18:
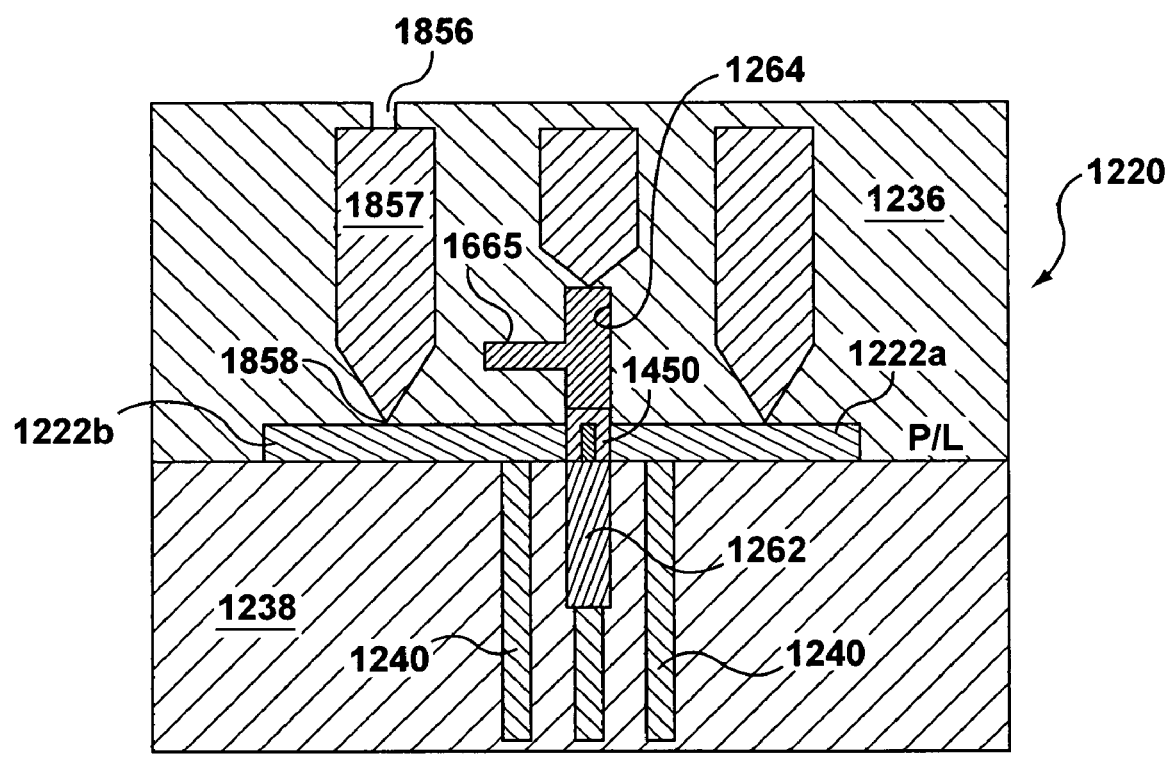

Next, the second material is injected along a runner system 1856, through a nozzle 1857 and a gate 1858 and into cavity zone 1222b, as shown in FIG. 18. The second material may be injected at the same time as the injection of the first material, after the first material has been injected or after the first material has been partially injected into cavity zone 1222a. The molten second material also contacts barrier 1450 and forms a bond. It shall be understood that the first or second material may be the same material, and also may be the same material as the barrier material. In addition, it should be understood that each of nozzles 1753 and 1857 may be valve-gated, thermal-gated and/or edge-gated.

Figure 19:
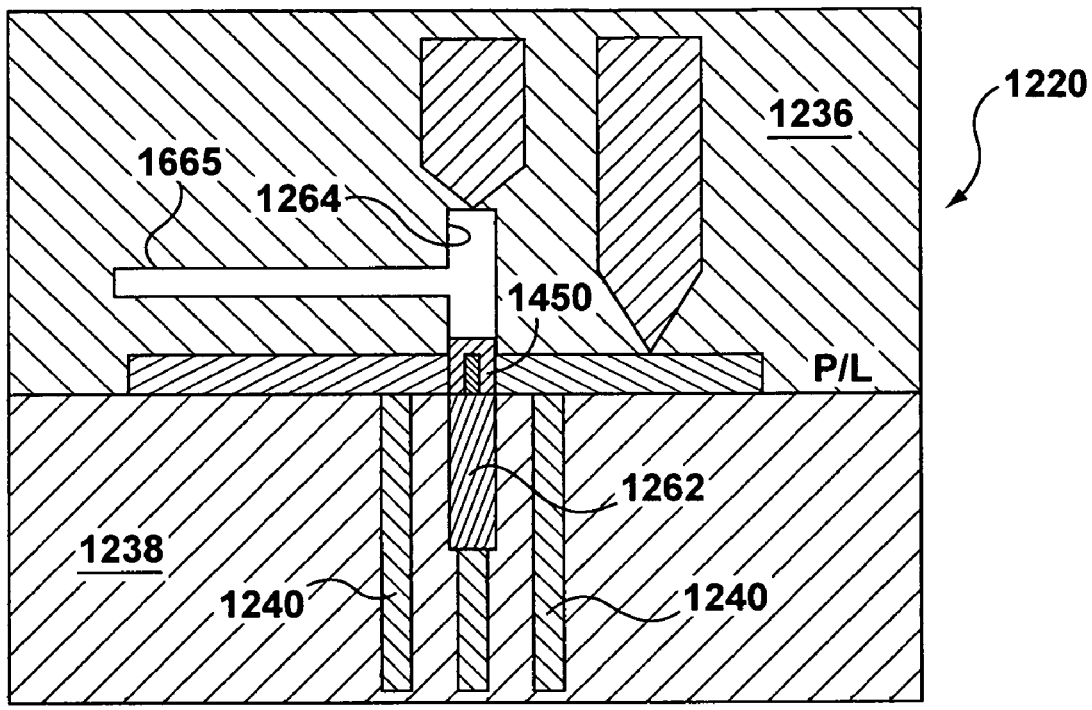

FIG. 19 shows the next step of the process. In that step, the pressure in pocket 1264 is removed in preparation for the opening of mold 1220 at parting line P/L. In addition, if a valve gate is employed in either of nozzles 1753 or 1857 it is closed.

Figure 20:
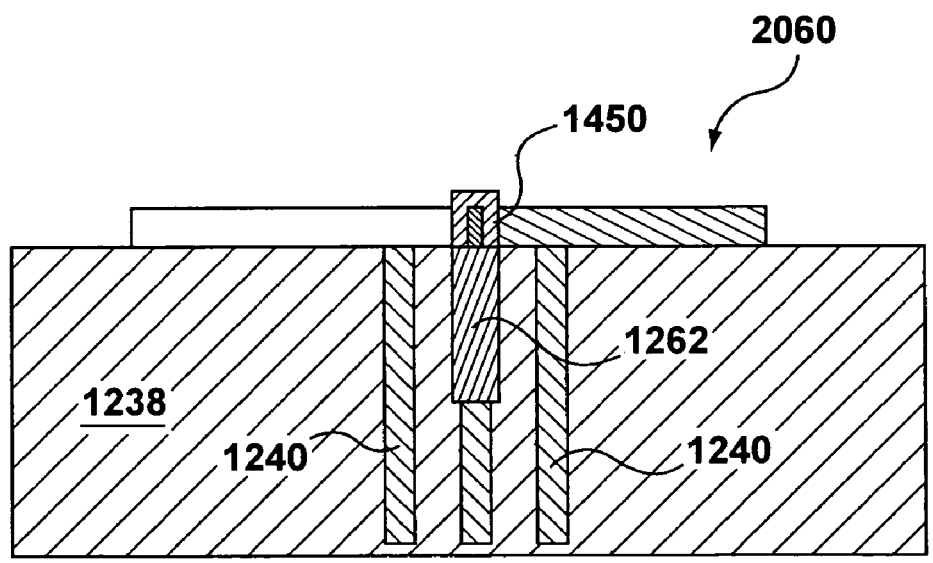

After the pressure is removed and any valve gates are closed, mold 1220 is opened and molded article 2060 is exposed, as shown in FIG. 20. In order to open mold 1220, mold core plate 1238 is retracted.

Figure 21:
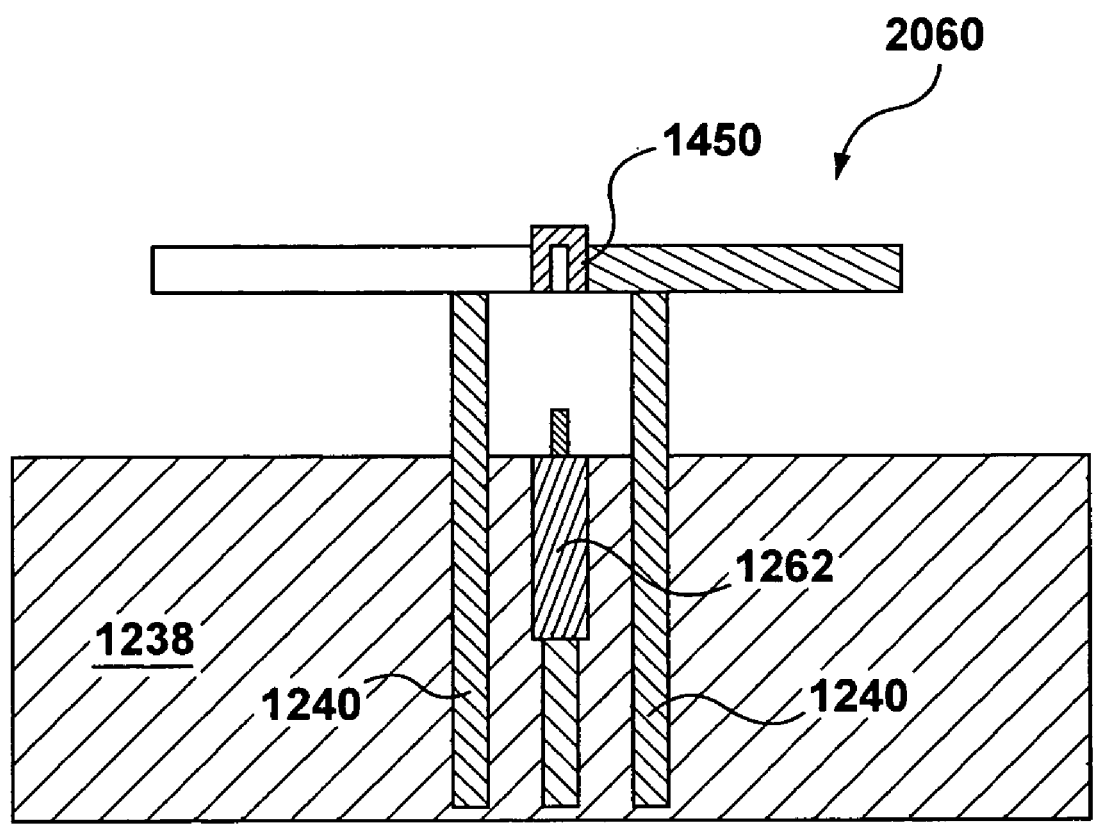
Figure 22:
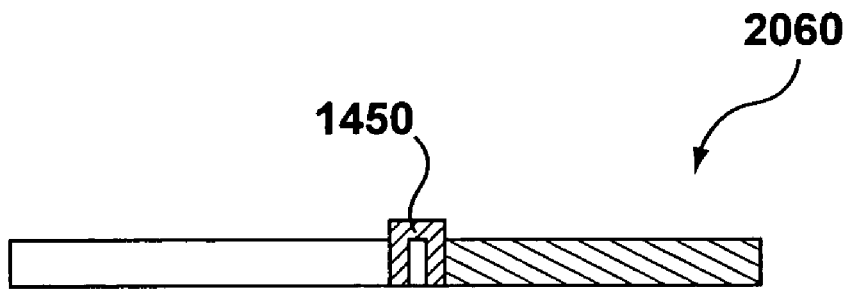

In the final step of the process, shown in FIG. 21, molded article 2060 is removed. Ejector pins 1240 are extended to push molded article 2060 out of mold core plate 1238 of mold 1220. FIG. 22 shows molded article 2060 after it is ejected from mold 1220.

Figure 23:
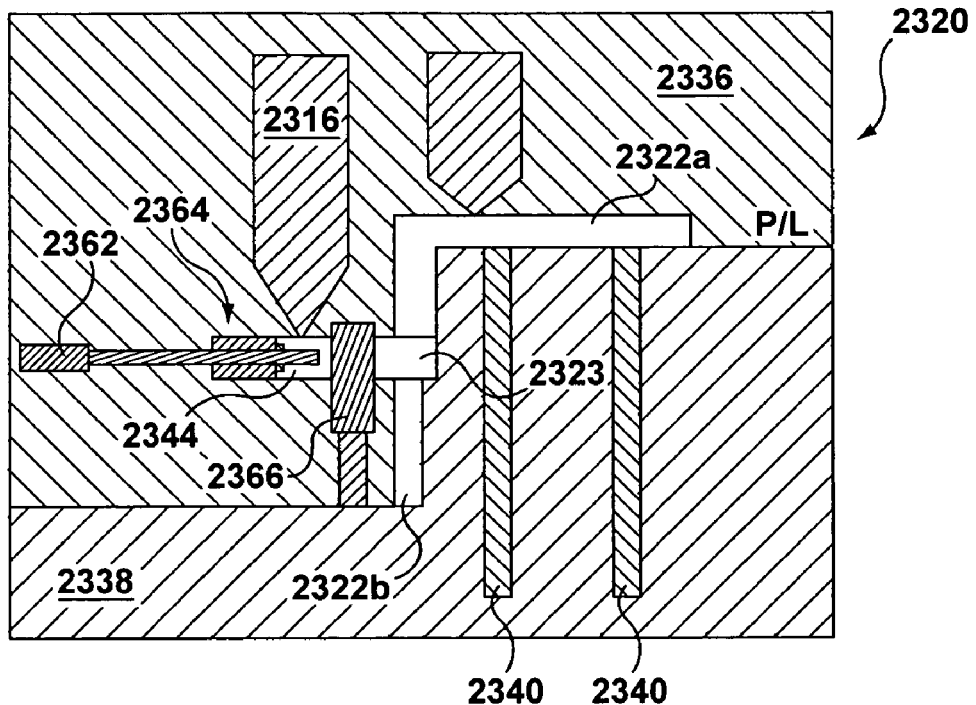
FIG. 23 is a cross-sectional view of a mold according to another embodiment of the invention.

FIGS. 23-26 illustrate a mold 2320 which is another embodiment that utilizes a movable barrier 2450. In FIG. 23, mold 2320 is shown in a "mold closed" position and includes a mold cavity 2322, that includes cavity zones 2322*a* and 2322*b*, a barrier receiving portion 2323 and a barrier pocket 2364 which includes a barrier molding portion 2344. Mold cavity 2322 is generally defined by a space created between a mold cavity plate 2336 of mold 2320, and a mold core plate 2338 of mold 2320. Mold cavity plate 2336 and mold core plate 2338 of mold 2320 are separable along a parting line, P/L. Mold 2320 also includes retractable ejector pins 2340.

Figure 24:
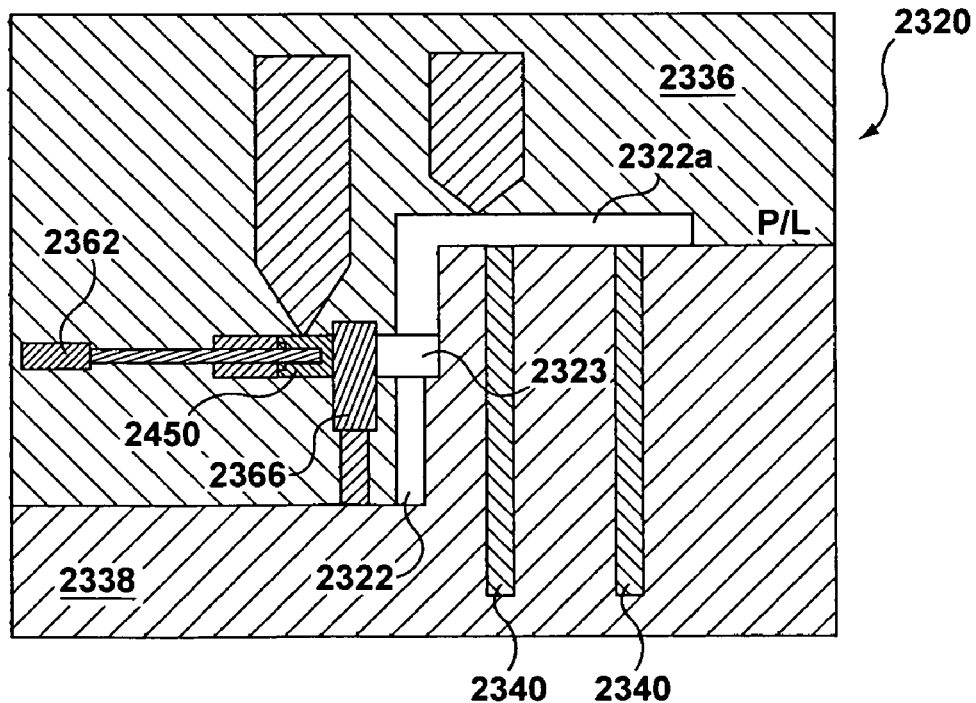
FIGS. 24 to 26 illustrate steps included in a process for molding an article using the mold of FIG. 23.
Figure 25:
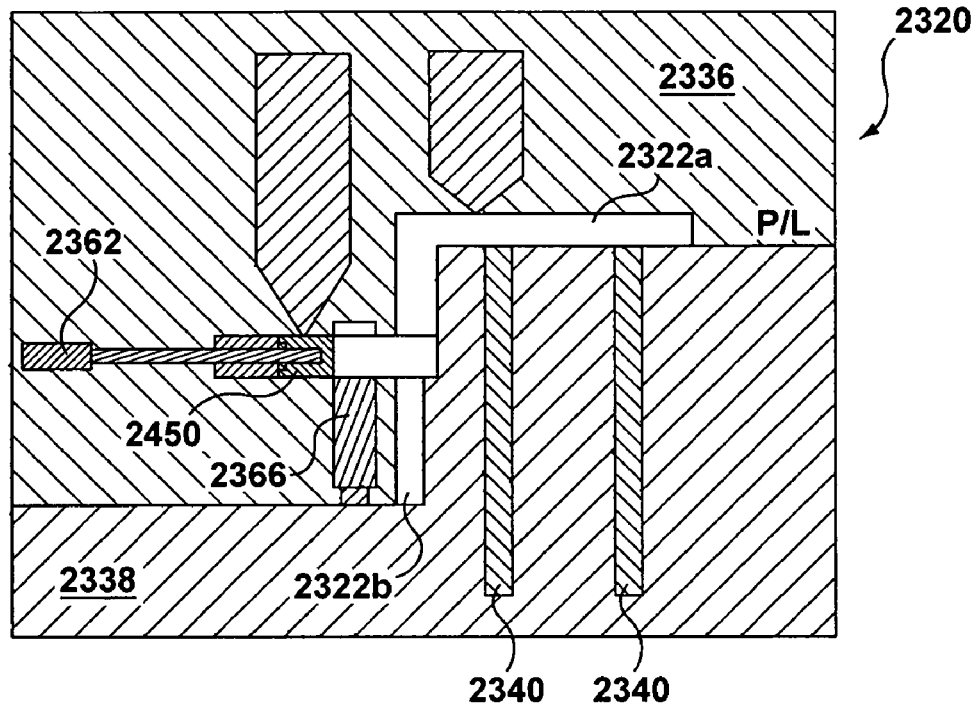

A retractable barrier shut-off 2366 and a retractable barrier core 2362 are included in mold 2320. As shown in FIGS. 24 and 25, when barrier core 2362 is in a retracted configuration and barrier shut-off 2366 is in an extended configuration they combine with mold cavity plate 2336 of mold 2320 to enclose barrier molding portion 2344 within pocket 2364.

Figure 26:
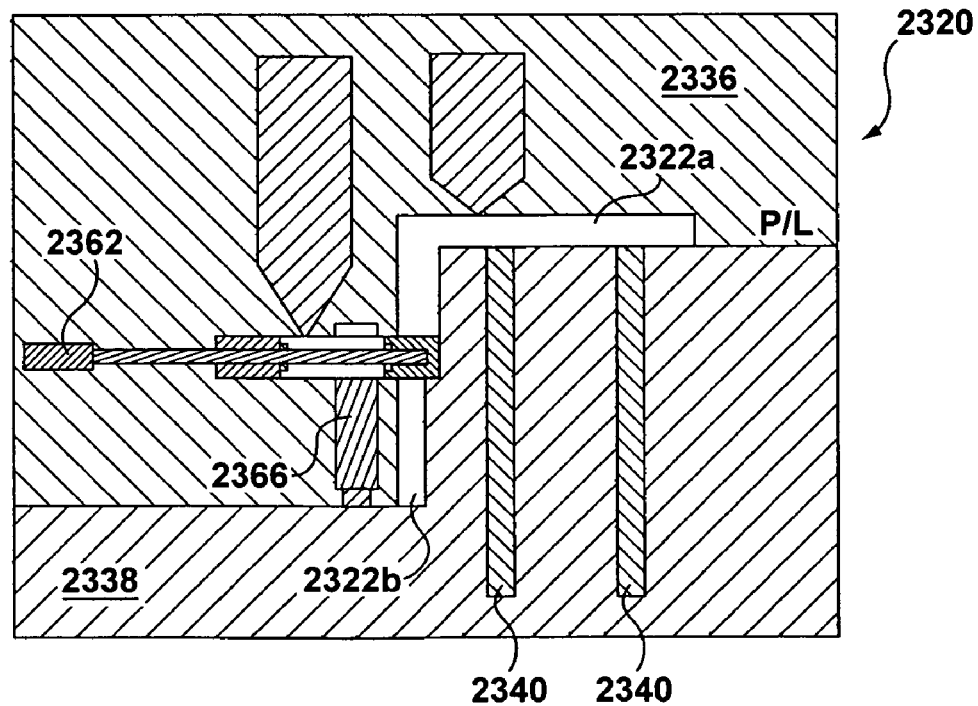

A barrier material is injected into barrier molding portion 2344 via barrier nozzle 2316 where it cools to form barrier 2450. After barrier 2450 has sufficiently cooled, barrier shut-off 2366 is retracted (FIG. 25) and barrier core 2362 is extended (FIG. 26). The barrier core 2362 pushes barrier 2450 into barrier receiving portion 2323, where it separates cavity zone 2322*a* from 2322*b*. After barrier 2450 is located in barrier receiving portion 2323, the subsequent materials are injected and a molded article is created as described above with respect to the previous embodiment.

Figure 27:
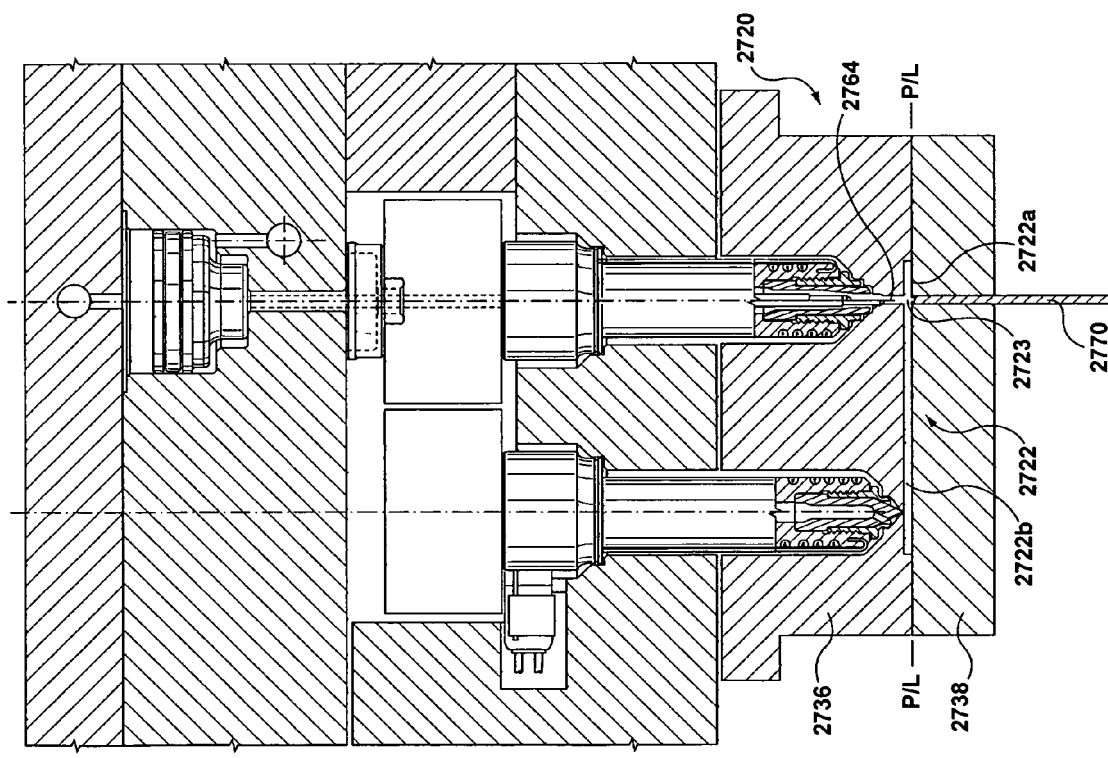
FIG. 27 is a cross-sectional view of a mold according to another embodiment of the invention.
Figure 28:
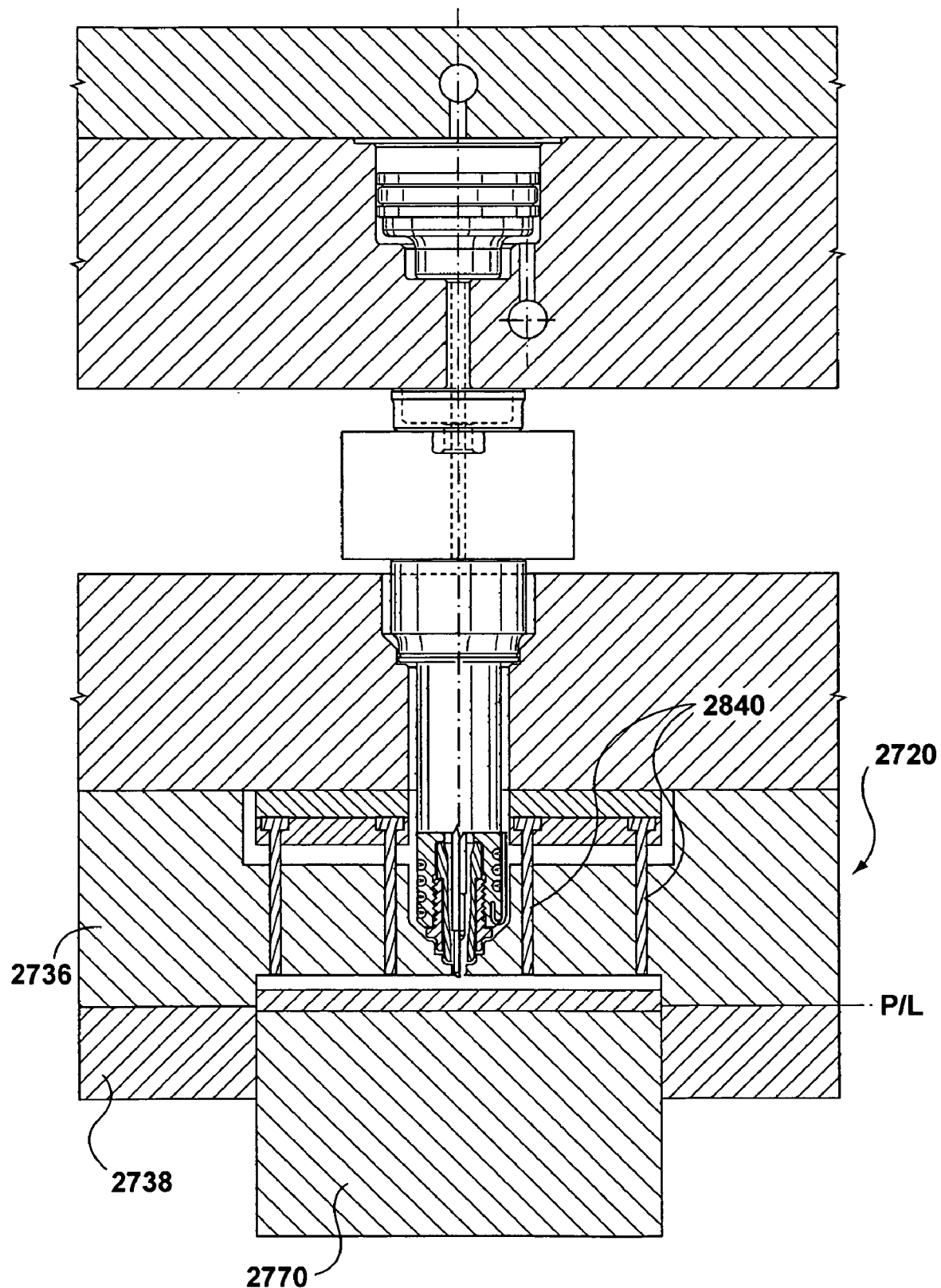
FIG. 28 is a side cross-sectional view of the mold of FIG. 27.
Figure 29:
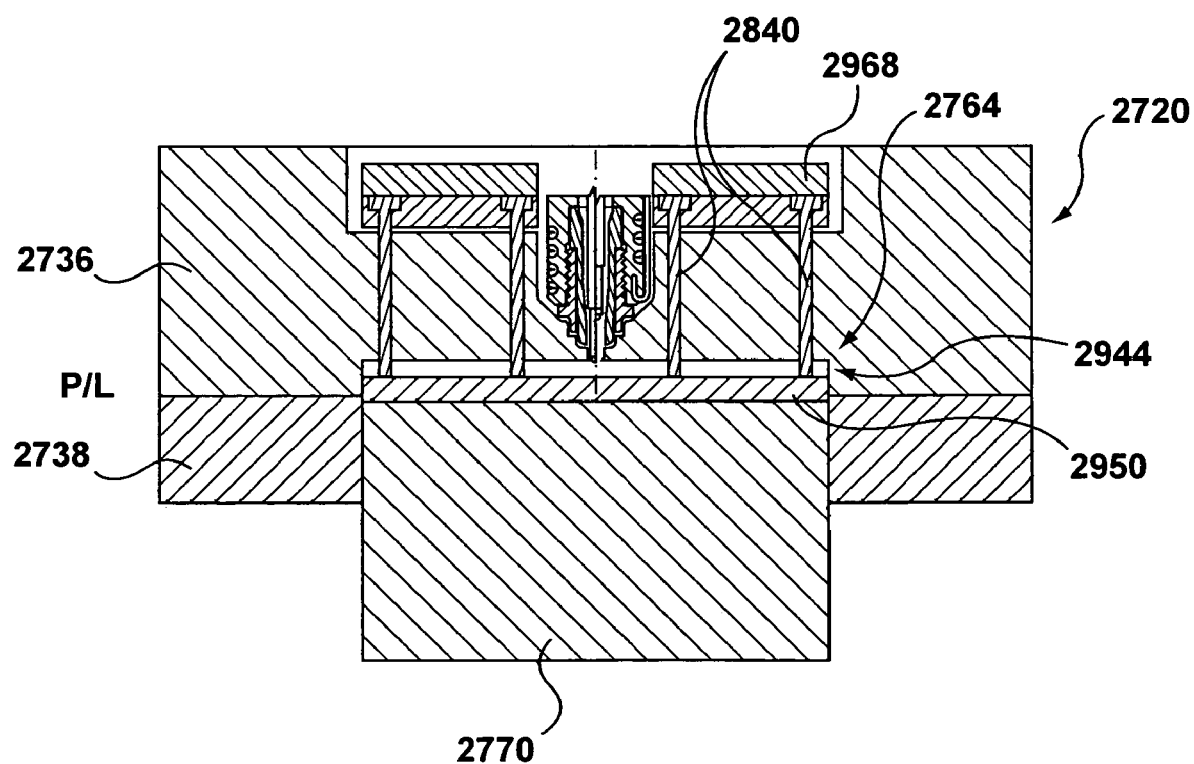
FIG. 29 is a cross-sectional view of a portion of the mold of FIG. 27.

Another embodiment is shown in FIGS. 27-29. A mold 2720 is shown in a "mold closed" position and includes a mold cavity 2722, that includes cavity zones 2722*a* and 2722*b*, a barrier receiving portion 2723 and a barrier pocket 2764 which includes a barrier molding portion 2744. Mold cavity 2722 is generally defined by a space created between a mold cavity plate 2736 of mold 2720, and a mold core plate 2738 of mold 2720. Mold cavity plate 2736 and mold core plate 2738 of mold 2720 are separable along a parting line, P/L. Mold 2720 also includes retractable ejector pins 2840 which are used to remove the molded article from mold 2720.

In this embodiment, mold 2720 also includes a retractable barrier positioner 2968 (shown in FIG. 29) and a retractable barrier guide 2770. When barrier positioner 2968 is in a retracted configuration and barrier guide 2770 is in an extended configuration they combine with mold cavity plate 2736 of mold 2720 to enclose barrier molding portion 2944 within barrier pocket 2764.

A barrier material is injected into barrier molding portion 2944 where it cools to form a barrier 2950. After barrier 2950 has sufficiently cooled, barrier positioner 2968 is extended and barrier guide 2770 is retracted. Barrier positioner 2968 forces barrier 2950 into barrier receiving portion 2730, where it separates cavity zone 2722*a* from 2722*b*. After barrier 2950 is located in barrier receiving portion 2730, the subsequent materials are injected and the molded article is created as described above with respect to the previous embodiments.

Figure 30:
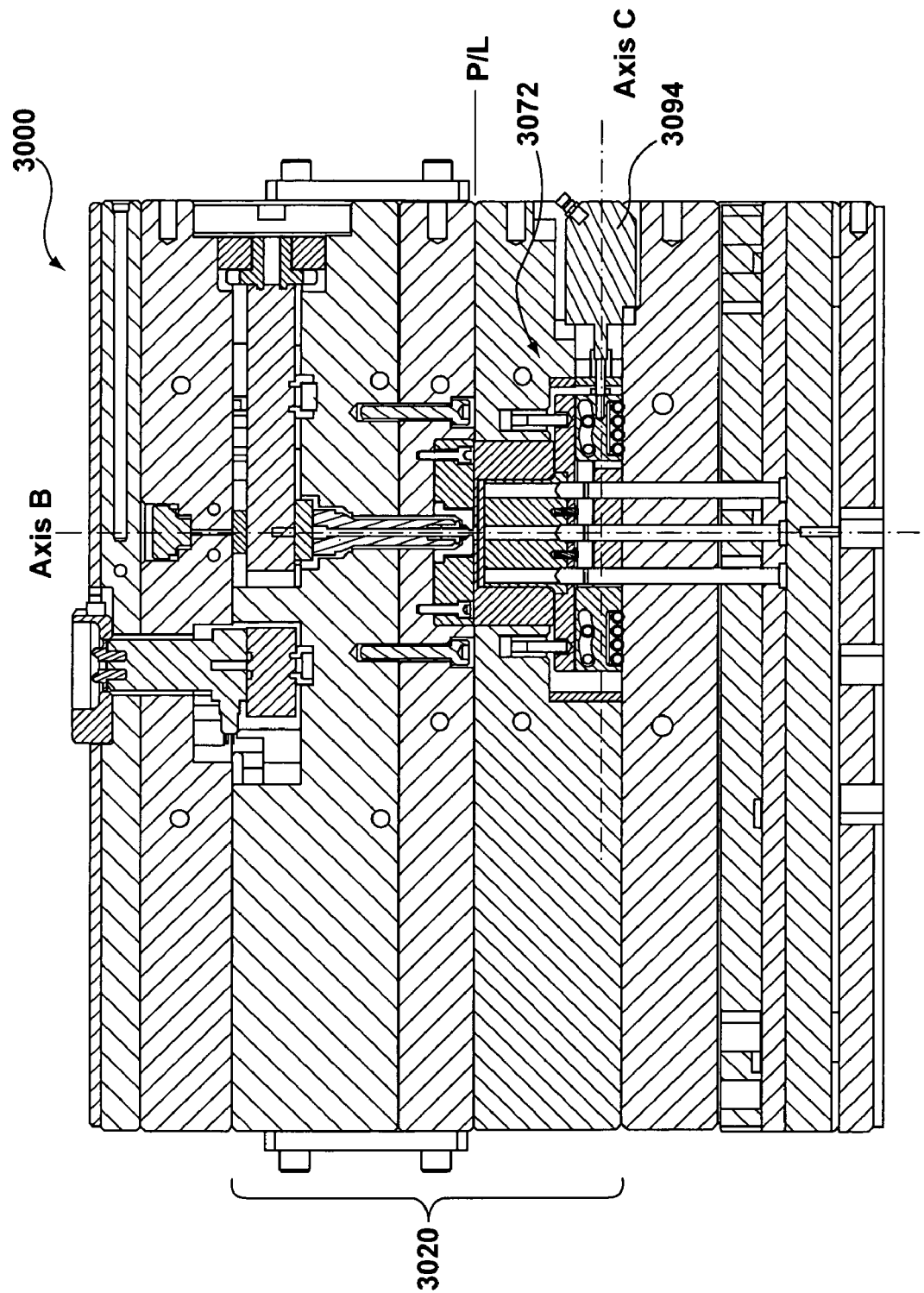
FIG. 30 is a cross-sectional view of a barrier locking mechanism included in an injection molding apparatus.

A barrier guide locking mechanism 3072 may be incorporated into an injection molding apparatus 3000, as shown in FIG. 30. Locking mechanism 3072 is used in combination with a linear actuator 3094 to extend and retract the retractable parts included in mold 3020.

Figure 31:
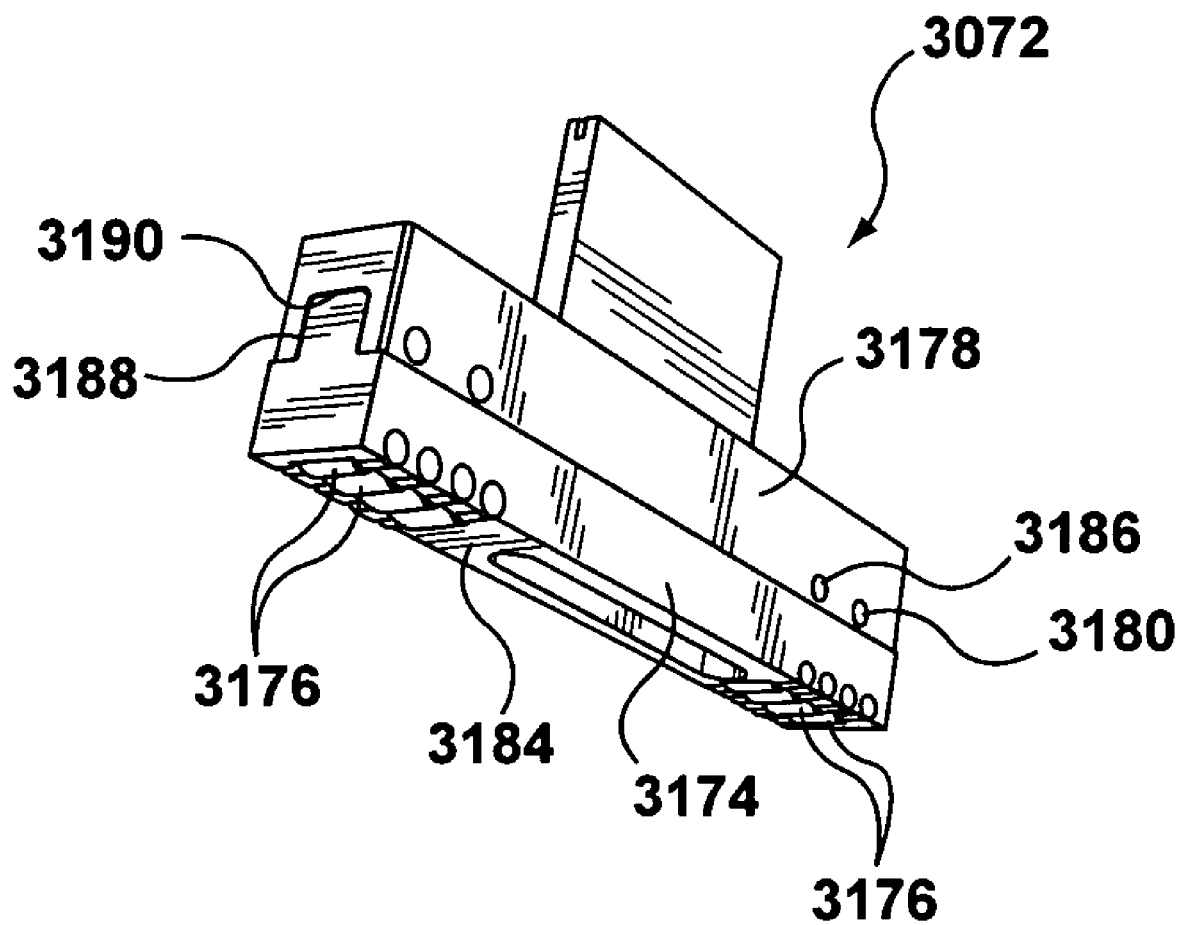
FIG. 31 is a perspective view of the barrier locking mechanism of FIG. 30.
Figure 32:
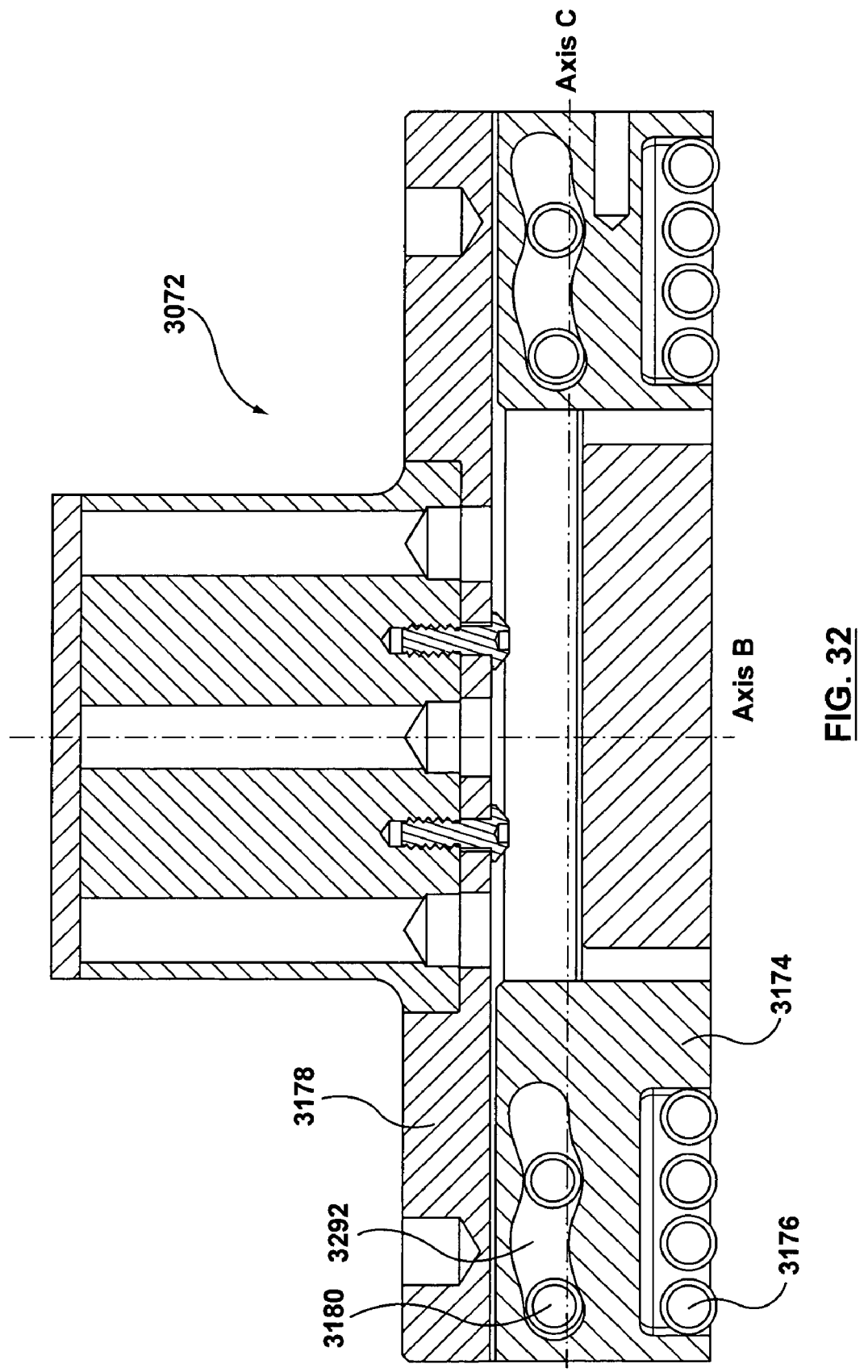
FIG. 32 is a cross-sectional view of the barrier locking mechanism of FIG. 30 in a retracted configuration.
Figure 33:
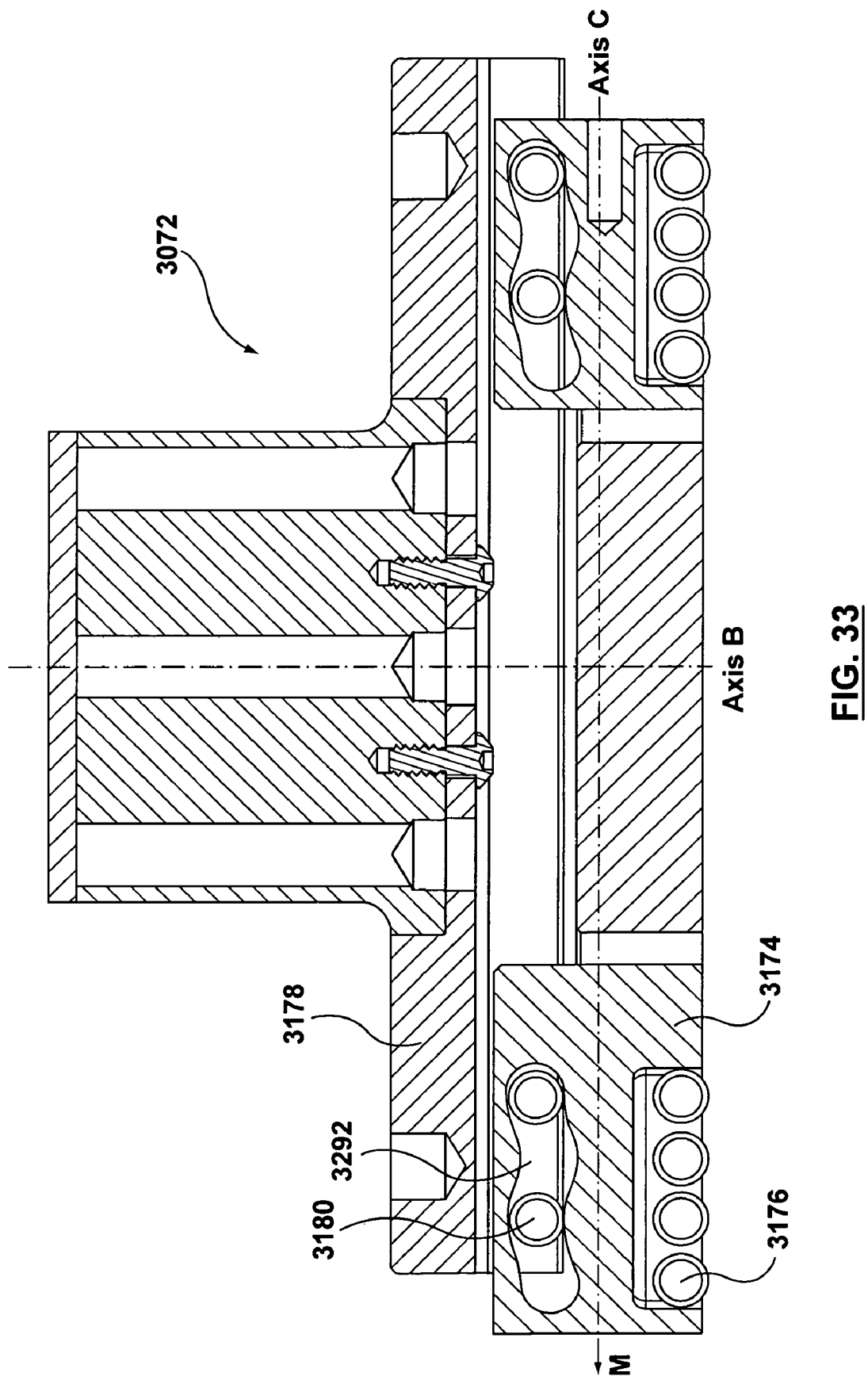
FIG. 33 is a cross-sectional view of the barrier locking mechanism of FIG. 30 in an extended configuration.

As shown in FIGS. 31-33, locking mechanism 3072 includes a translatable sled 3174, translation rollers 3176, a riser 3178 and lifting rollers 3180. Translation rollers 3176 are coupled to sled 3174 so that translation rollers 3176 extend below a bottom surface 3184 of sled 3174 and are rotatable. A bottom surface 3190 of riser 3178 includes a channel 3188 that receives a top portion of sled 3174. Lifting roller apertures 3186 extend laterally through side walls of riser 3174 adjacent to channel 3188. Lifting rollers 3180 are rotatably received in apertures 3186 such that lifting rollers 3180 extend across channel 3188.

As shown in FIG. 32, slots 3292 extend laterally through the top portion of sled 3174 and receive the portion of lifting rollers 3180 that extends across channel 3188. Slots 3292 are shown having a zig-zagged shape, but they may also be curved or linear.

Locking mechanism 3072 is movable between a retracted configuration, shown in FIG. 32, and an extended configuration, shown in FIG. 33. When locking mechanism 3072 is installed in mold 3020, riser 3178 is restricted to movement along a first axis B and sled 3174 is restricted to movement along a second axis C. When sled 3174 is moved in a direction M along axis C by rolling it on translation rollers 3176, the restriction of riser 3178 in the direction of axis B results in lifting rollers 3180 rolling within slots 3292. As shown in FIGS. 32 and 33, slots 3292 include a portion that is angled with respect to bottom surface 3184 of sled 3174. As a result, lifting rollers 3180 are caused to roll within slots 3292 in a direction that is angled with respect to bottom surface 3184 of sled 3174. The angled motion of lifting rollers 3180 causes riser 3178 to move in the direction of axis B in an amount corresponding to the amplitude of the vertical component of the angled path of lifting rollers 3180.

Translation of sled 3174 may be caused by any actuation mechanism known in the art. As shown, a linear actuator 3094 is used to translate sled 3174. The linear actuator may be any such actuator known in the art, for example, a pnuematic or hydraulic cylinder may be employed.

Figure 35:
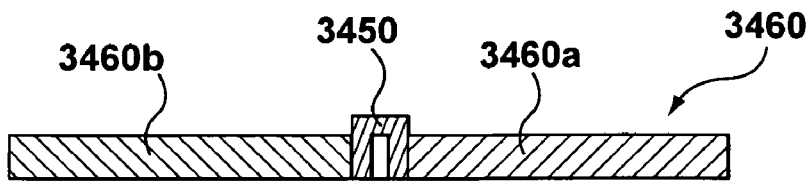
FIG. 35 is a cross-sectional view of the molded article of FIG. 34 taken along line A-A.
Figure 34:
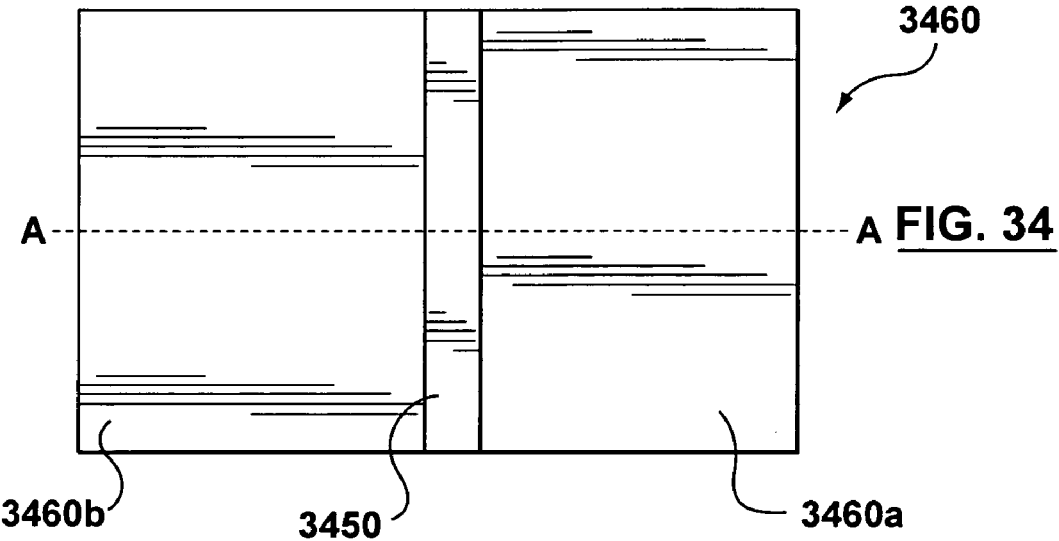
FIG. 34 is a top view of one example of a molded article that can be molded using the embodiments of the invention.

FIGS. 34-41 illustrate various embodiments of molded articles that may be manufactured using the methods and apparatuses described above. FIG. 34 illustrates a molded article 3460 and FIG. 35 illustrates a cross-sectional view of molded article 3460 taken along line A-A. Molded article 3460 includes a barrier 3450 that extends across an entire length of the part creating zones 3460*a* and 3460*b*.

Figure 37:
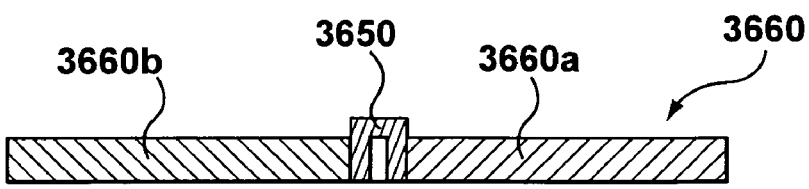
FIG. 37 is a cross-sectional view of the molded article of FIG. 36 taken along line A-A.
Figure 36:
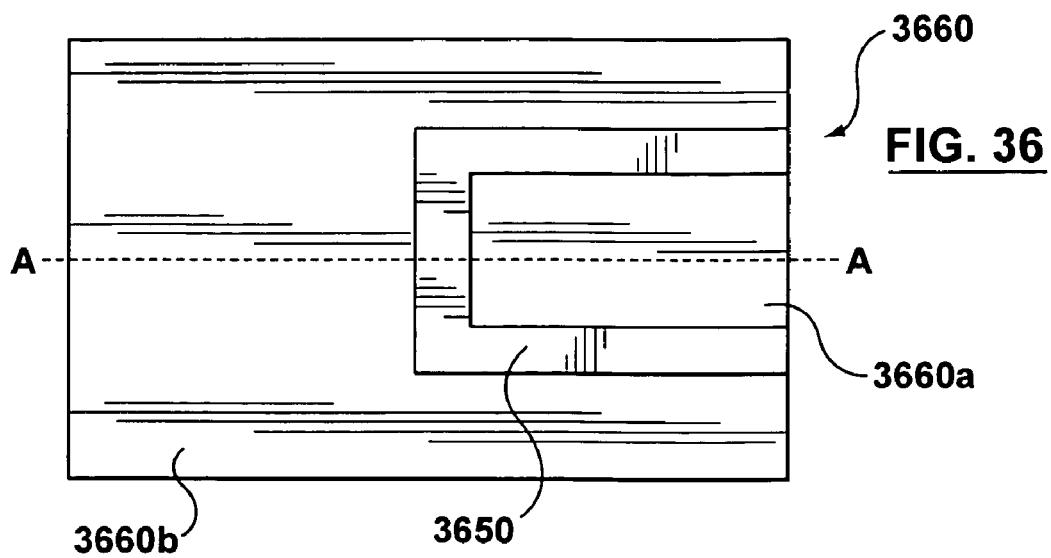
FIG. 36 is a top view of another example of a molded article that can be molded using the embodiments of the invention.

FIGS. 36 and 37 illustrate a molded article 3660 where FIG. 37 is a cross-sectional view of molded article 3660 taken along line A-A. A barrier 3650 is utilized in molded article 3660 to create a zone 3660*a* that is surrounded on three sides by a larger zone 3660*b*.

Figure 39:
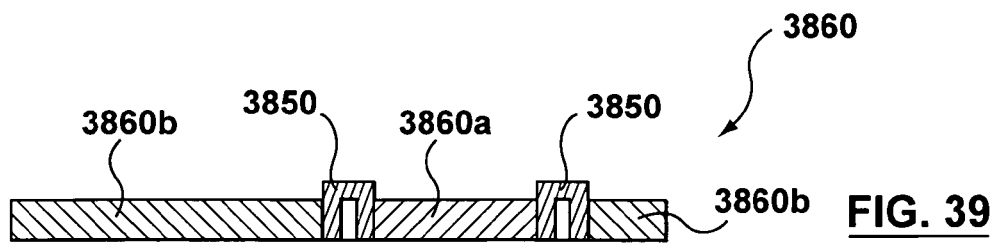
FIG. 39 is a cross-sectional view of the molded article of FIG. 38 taken along line A-A.
Figure 38:
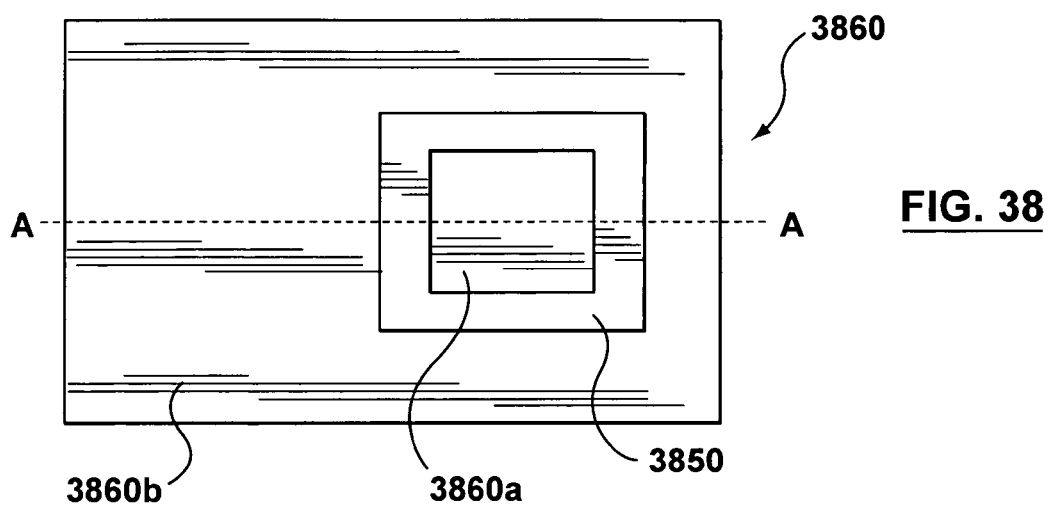
FIG. 38 is a top view of another example of a molded article that can be molded using the embodiments of the invention.

FIGS. 38 and 39 illustrate a molded article 3860 where FIG. 39 is a cross-sectional view of molded article 3860 taken along line A-A. Molded article 3680 includes a barrier 3850 creates a zone 3860*a* that is completely surrounded by a larger zone 3860*b*.

Figure 41:
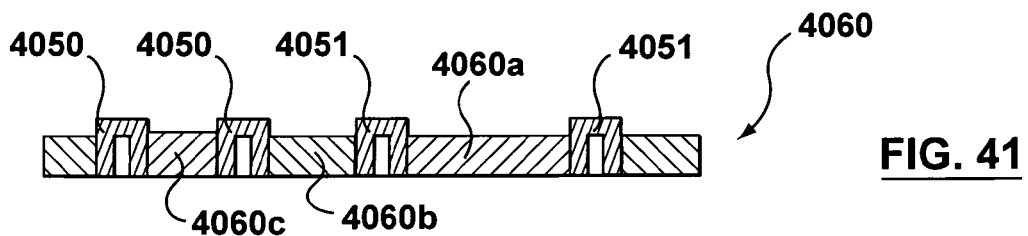
FIG. 41 is a cross-sectional view of the molded article of FIG. 40 taken along line A-A.
Figure 40:
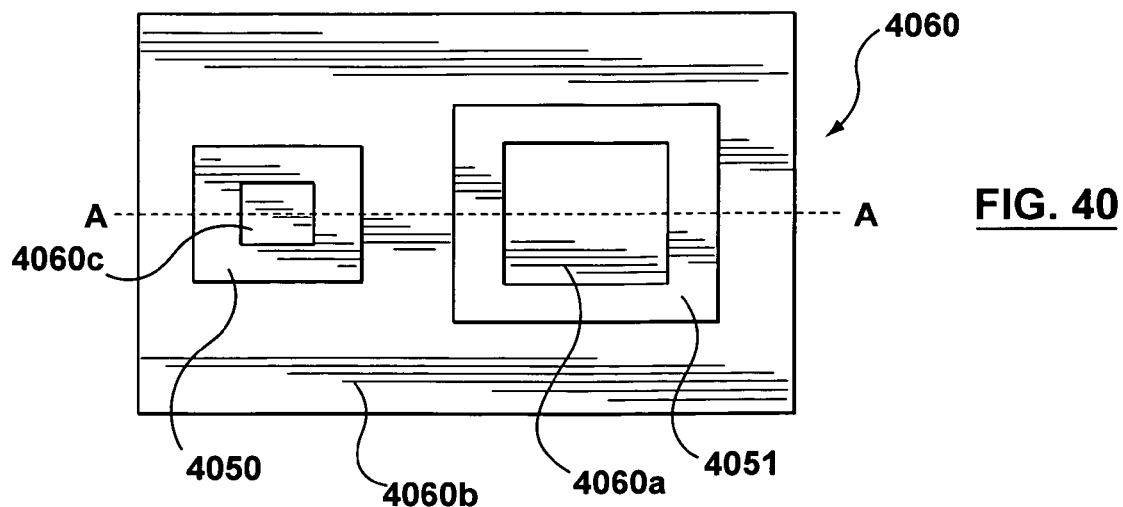
FIG. 40 is a top view of another example of a molded article that can be molded using the embodiments of the invention.

Finally, FIGS. 40 and 41 illustrate a molded article 4060 where FIG. 41 is a cross-sectional view of molded article 4060 taken along line A-A. Multiple barriers 4050 and 4051 are included in molded article 4060 to create zones 4060*a*, 4060*b* and 4060*c*. Both zones 4060*a* and 4060*c* are completely surrounded by zone 4060*b*. As shown in molded article 4060, a zone may include additional molded features such as the logo shown in zone 4060*c*.

Although FIGS. 34-41 show embodiments where three materials are used, it should be understood that the present invention is not so limited and multiple zones may be constructed from a common material. In addition, a zone may be injected with the same material used for the barrier.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of injection molding a molded article, comprising the steps of:
   providing a closed mold having a mold cavity;
   creating an enclosed barrier molding portion within the mold cavity;
   injecting a barrier material into the barrier molding portion to create a barrier;
   configuring the mold while the mold remains closed such that the barrier is located in a barrier receiving portion and isolates a first empty zone of the mold cavity from a second empty zone of the mold cavity, the barrier having a portion that is located between the first and second empty zones and a further portion that is raised above and partially overlaps each of the first and second empty zones;
   injecting a first material into the first empty zone; and
   injecting a second material into the second empty zone.

2. The method of claim 1, further comprising the steps of: opening the mold; and ejecting the molded article.

3. The method of claim 1, wherein the barrier material and the first material are the same.

4. The method of claim 1, wherein the barrier material and the second material are the same.

5. The method of claim 1, wherein the step of configuring the mold comprises the steps of:
   retracting a barrier core configured to extend longitudinally into a pocket of the mold cavity to create the barrier molding portion; and
   applying a pressurized fluid to the barrier.

6. The method of claim 1, wherein the step of configuring the mold comprises the steps of:
   retracting a barrier shut-off that is configured to extend transversely across a pocket of the mold cavity to form the barrier molding portion; and
   extending a barrier core.

7. The method of claim 1, wherein the step of configuring the mold comprises the steps of:
   retracting a barrier guide configured to extend longitudinally into a pocket of the mold cavity to form the barrier molding portion; and
   extending a barrier positioner.

8. The method of claim 1, wherein the step of configuring the mold comprises the step of:
   retracting a plurality of barrier molding portion side walls.

9. A method of injection molding a molded article, comprising the steps of:
   providing a closed mold having a mold cavity and a retractable barrier core; creating an enclosed barrier molding portion within the mold cavity by extending the barrier core;
   injecting a barrier material into the barrier molding portion to create a barrier;
   positioning the barrier into a barrier receiving portion of the mold cavity while the mold remains closed such that the barrier isolates a first empty portion of the mold cavity from a second empty portion of the mold cavity by retracting the barrier core and injecting pressurized fluid into the barrier molding portion;
   injecting a first material into the first empty portion;
   injecting a second material into the second empty portion;
   opening the mold; and
   ejecting the molded article by extending a plurality of ejector pins.

10. A method of injection molding a molded article, comprising the steps of:
    providing a closed mold having a mold cavity;
    creating an enclosed barrier molding portion within a pocket of the mold cavity;
    injecting a barrier material into the barrier molding portion to create a barrier;
    moving the barrier into a barrier receiving portion while the mold remains closed such that the barrier isolates a first empty zone of the mold cavity from a second empty zone of the mold cavity;
    injecting a first material into the first empty zone;
    injecting a second material into the second empty zone.

11. The method of claim 10, wherein the step of moving the barrier comprises the steps of:
    retracting a barrier core configured to extend longitudinally into a pocket of the mold cavity to create the barrier molding portion; and applying a pressurized fluid to the barrier.

12. The method of claim 10, wherein the step of moving the barrier comprises the steps of:
    retracting a barrier shut-off that is configured to extend transversely across a pocket of the mold cavity to form the barrier molding portion; and extending a barrier core.

13. The method of claim 10, wherein the step of moving the barrier comprises the steps of:
    retracting a barrier guide configured to extend longitudinally into a pocket of the mold cavity to form the barrier molding portion; and extending a barrier postioner.

14. A method of injection molding a molded article, comprising the steps of:
    providing a closed mold having a mold cavity and retractable barrier side walls;
    creating an enclosed barrier molding portion within the mold cavity by extending the barrier side walls;
    injecting a barrier material into the barrier molding portion to create a barrier;
    retracting the barrier side walls while the mold remains closed such that the barrier isolates a first empty portion of the mold cavity from a second empty portion of the mold cavity;
    injecting a first material into the first empty portion;
    injecting a second material into the second empty portion;
    opening the mold; and
    ejecting the molded article by extending a plurality of ejector pins,
    wherein creating the enclosed barrier molding portion includes creating a barrier molding portion that is between the first empty portion of the mold cavity and the second empty portion of the mold cavity and a further barrier molding portion that is raised above and partially overlaps each of the first empty portion of the mold cavity and the second empty portion of the mold cavity.

* * * * *